(12) United States Patent
Kawamura

(10) Patent No.: US 11,901,839 B2
(45) Date of Patent: Feb. 13, 2024

(54) SEMICONDUCTOR DEVICE AND POWER CONVERSION APPARATUS

(71) Applicant: Mitsubishi Electric Corporation, Tokyo (JP)

(72) Inventor: Mao Kawamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/872,157

(22) Filed: Jul. 25, 2022

(65) Prior Publication Data
US 2023/0170823 A1    Jun. 1, 2023

(30) Foreign Application Priority Data
Dec. 1, 2021   (JP) .................................. 2021-195088

(51) Int. Cl.
*H02M 7/48*    (2007.01)
*H02M 7/537*   (2006.01)
*H02M 1/088*   (2006.01)

(52) U.S. Cl.
CPC ......... *H02M 7/4818* (2021.05); *H02M 1/088* (2013.01); *H02M 7/537* (2013.01)

(58) Field of Classification Search
CPC ..... H02M 7/4818; H02M 7/537; H02M 1/088
See application file for complete search history.

(56) References Cited

U.S. PATENT DOCUMENTS

| | | | |
|---|---|---|---|
| 11,532,590 B2* | 12/2022 | Masumoto | H01L 25/18 |
| 11,581,252 B2* | 2/2023 | Yamada | H01L 24/05 |
| 2012/0307540 A1* | 12/2012 | Tagome | H03K 17/164 |
| | | | 363/131 |

(Continued)

FOREIGN PATENT DOCUMENTS

| | | |
|---|---|---|
| JP | 2008-182784 A | 8/2008 |
| JP | 2011-147212 A | 7/2011 |
| JP | 2016-524447 A | 8/2016 |

(Continued)

OTHER PUBLICATIONS

Notice of Reasons for Refusal dated Oct. 18, 2022 from the Japanese Patent Office in Japanese Application No. 2021-195088.

*Primary Examiner* — Gary A Nash
(74) *Attorney, Agent, or Firm* — Sughrue Mion, PLLC; Richard C. Turner

(57) ABSTRACT

A semiconductor device includes: a first circuit including semiconductor switching elements connected in parallel, each semiconductor switching element having a first electrode, a second electrode, and a third electrode and being configured to be controlled, according to a voltage between the first electrode and the third electrode, to attain conduction or non-conduction between the second electrode and the third electrode; and a control unit connected to the first electrode of each semiconductor switching element and configured to control the voltage between the first electrode and the third electrode. The semiconductor device is configured to satisfy a first condition that an impedance Zg on a first path between the first electrodes of the respective semiconductor switching elements is higher, by at least a set value, than an impedance Zs on a third path making connection between the third electrodes of the respective semiconductor switching elements.

18 Claims, 21 Drawing Sheets

(56) References Cited

U.S. PATENT DOCUMENTS

2016/0126822 A1    5/2016  Lyle et al.
2020/0185359 A1*   6/2020  Nakashima ........... H02M 1/088

FOREIGN PATENT DOCUMENTS

| JP | 2019-055659 A | 4/2019 |
| JP | 2020-156304 A | 9/2020 |
| WO | 2011/096232 A1 | 8/2011 |
| WO | 2019/044748 A1 | 3/2019 |

* cited by examiner

SEMICONDUCTOR DEVICE AND POWER CONVERSION APPARATUS

BACKGROUND OF THE INVENTION

1. Field of the Invention

The present disclosure relates to a semiconductor device and a power conversion apparatus.

2. Description of the Background Art

In recent years, power conversion apparatuses for electric powertrains that transmit motive power between an engine and a drive wheel and that are used in hybrid automobiles, electric automobiles, or the like have been formed by using power modules including therein semiconductor switching elements such as insulated gate bipolar transistors (IGBTs) or metal oxide semiconductor field effect transistors (MOSFETs). A plurality of the power modules are connected in parallel and simultaneously driven so as to be switched, whereby a power capacity for processing is increased.

In this type of power conversion apparatus, a switching timing of a semiconductor switching element might differ among the plurality of the power modules connected in parallel, owing to: a difference in characteristics among the power modules arising from a difference in characteristics among the semiconductor switching elements included in the power modules; a variation among inductances in a main circuit or a control circuit in which the power modules are incorporated; or the like.

Conventionally, the difference in the switching timing leads to occurrence of unbalance in current among the power modules. This unbalance might result in, for example, concentration of current in a power module turned on earliest and increase in loss so that the power module experiences a defect. In order to solve such a defect, a power conversion apparatus including a semiconductor module serving as a semiconductor device has been disclosed, for example. The power conversion apparatus has the following configuration.

That is, the conventional power conversion apparatus in which a main circuit unit is composed of a plurality of semiconductor modules connected in parallel, includes: a gate drive circuit which drives the semiconductor modules so as to turn on/off the semiconductor modules; and a first gate wire for an OFF operation, the first gate wire being provided to each semiconductor module and making connection between the semiconductor module and the gate drive circuit or another one of the semiconductor modules. Further, a semiconductor module having a lower gate threshold voltage is connected, by a first gate wire having a lower impedance, to the gate drive circuit or another one of the semiconductor modules such that the value of gate current becomes the same among the semiconductor modules at the time of an OFF operation (see, for example, Patent Document 1).

Patent Document 1: Japanese Laid-Open Patent Publication No. 2020-156304

SUMMARY OF THE INVENTION

The above conventional power conversion apparatus is configured such that a semiconductor module structurally having a lower gate threshold voltage is connected, by a first gate wire having a lower impedance, to the gate drive circuit or another one of the semiconductor modules in order to suppress unbalance, in current, that arises from a difference in switching timing among the semiconductor modules connected in parallel. Consequently, unbalance in gate current among the semiconductor modules is suppressed.

However, even if the configuration described in the above Patent Document 1 is used, a problem arises in that an operational defect such as an erroneous turn-on operation might occur in any of semiconductor switching elements included in the semiconductor nodules connected in parallel.

The present disclosure has been made to solve the above problem, and an object of the present disclosure is to provide: a semiconductor device in which an operational defect is inhibited from occurring among semiconductor switching elements connected in parallel; and a power conversion apparatus including the semiconductor device.

A semiconductor device according to the present disclosure is a semiconductor device including:
   a first circuit including semiconductor switching elements connected in parallel, each semiconductor switching element having a first electrode, a second electrode, and a third electrode and being configured to be controlled, according to a voltage between the first electrode and the third electrode, to attain conduction or non-conduction between the second electrode and the third electrode; and
   a control unit connected to the first electrode of each semiconductor switching element and configured to control the voltage between the first electrode and the third electrode, wherein
   the semiconductor device is configured to satisfy a first condition that an impedance $Zg$ on a first path between the first electrodes of the respective semiconductor switching elements is higher, by at least a set value, than an impedance $Zs$ on a third path making connection between the third electrodes of the respective semiconductor switching elements.

Further, a power conversion apparatus according to the present disclosure is a power conversion apparatus including:
   a power converter having phases and configured to perform power conversion between DC and AC; and
   the semiconductor device configured as above and provided to each of the phases, wherein
   the control unit controls the power converter to perform power conversion between DC and AC.

The semiconductor device and the power conversion apparatus according to the present disclosure make it possible to inhibit an operational defect of each semiconductor switching element.

DETAILED DESCRIPTION OF THE PREFERRED EMBODIMENTS OF THE INVENTION

Figure 1:
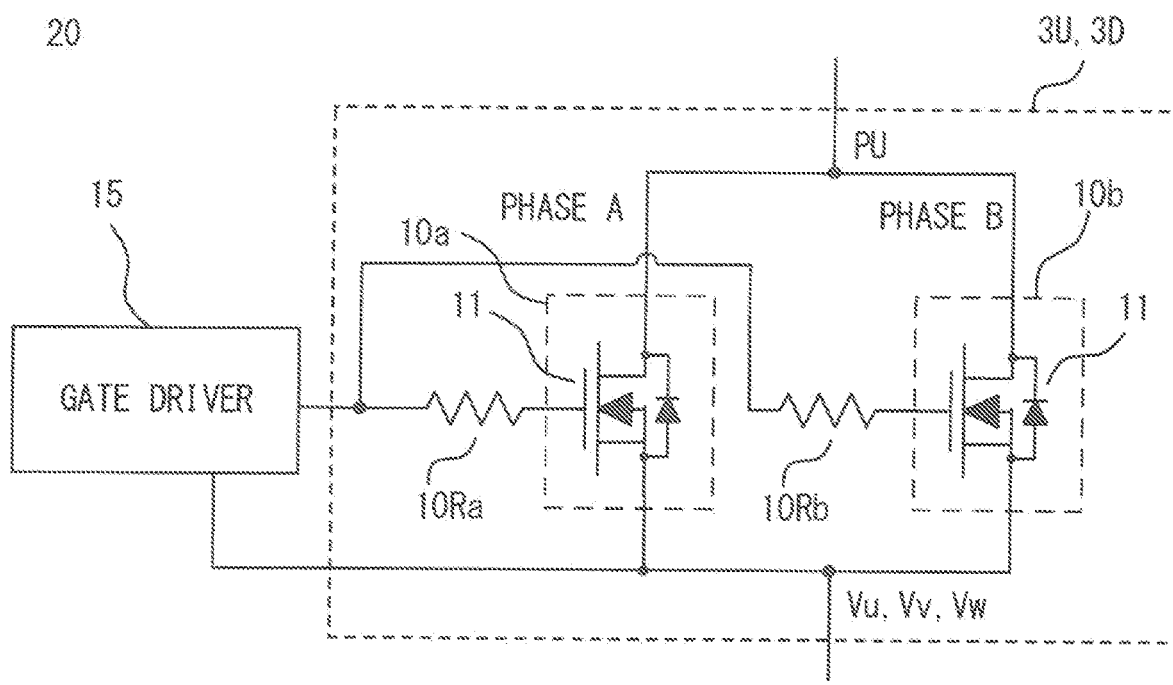
FIG. 1 is a schematic configuration diagram showing a semiconductor device according to a first embodiment.

Hereinafter, semiconductor devices and power conversion apparatuses according to preferred embodiments of the present disclosure will be described with reference to the drawings. The same or corresponding portions in the drawings are denoted by the same reference characters, and redundant descriptions thereof will be omitted.

First Embodiment

FIG. 1 is a schematic configuration diagram showing a semiconductor device 20 according to a first embodiment.

Figure 2:
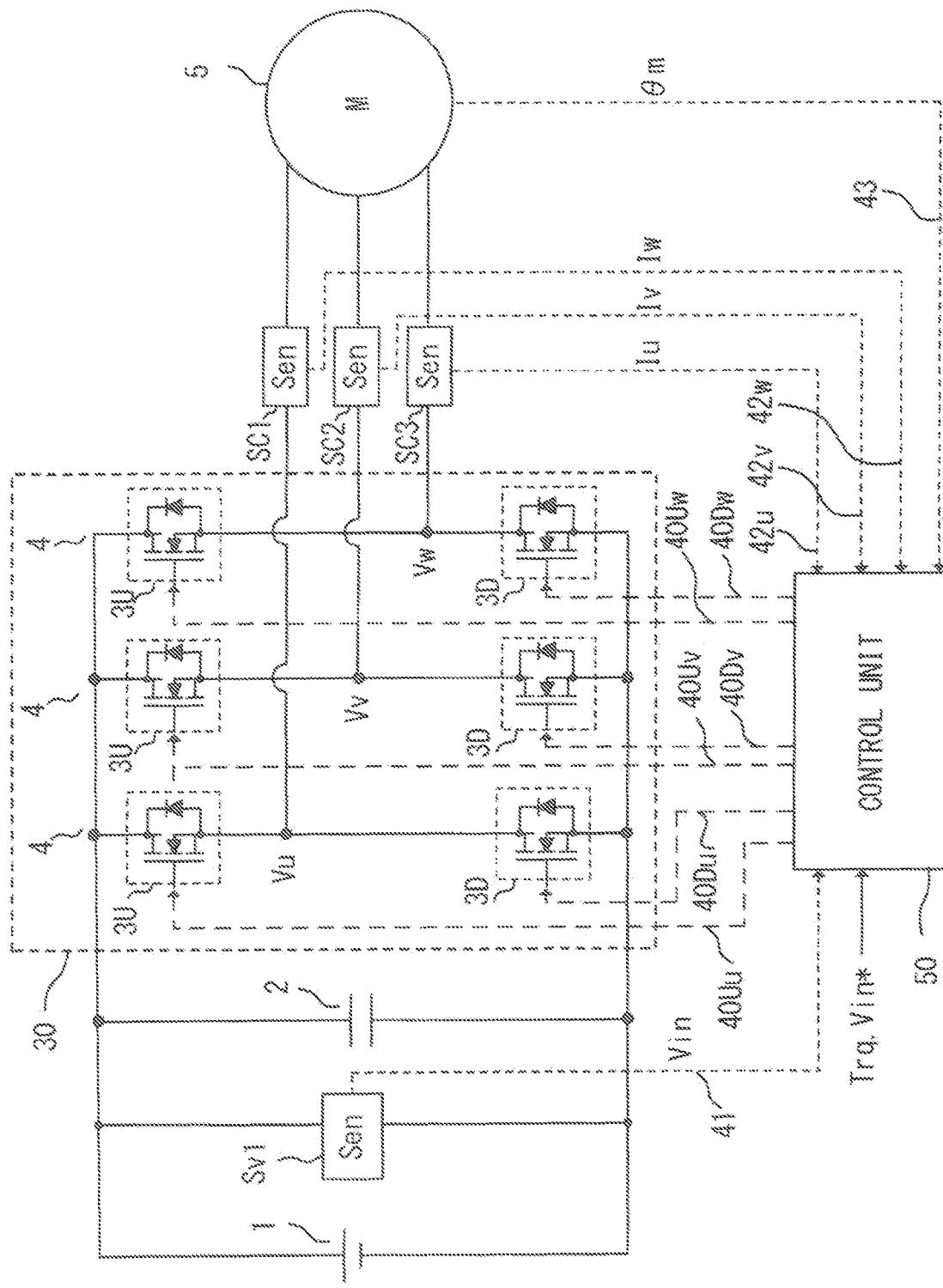
FIG. 2 is a schematic configuration diagram showing a power conversion apparatus according to the first embodiment.

FIG. 2 is a schematic configuration diagram showing a power conversion apparatus 100 according to the present first embodiment including the semiconductor device 20 shown in FIG. 1.

Firstly, the power conversion apparatus 100 according to the present embodiment will be described with reference to FIG. 2.

The power conversion apparatus 100 includes: an inverter circuit 30 serving as a main circuit unit; and a control unit 50 which controls the inverter circuit 30.

A DC power storage unit 1 serving as a DC circuit is connected to an input side of the inverter circuit 30, a motor 5 serving as an AC circuit is connected to an output side of the inverter circuit 30, and the power conversion apparatus 100 performs power conversion between AC and DC. Here, the voltage of the DC power storage unit 1 is at least 100 V, and the inverter circuit 30 has a configuration adapted to high voltage and high current as described below.

The inverter circuit 30 includes semiconductor switching element groups 3 (3U and 3D) each serving as a first circuit and each having a plurality of semiconductor switching elements. A detailed configuration of the semiconductor switching element groups 3 (3U and 3D) will be described later.

The inverter circuit 30 has a three-phase configuration in which leg circuits 4 each obtained by connecting the corresponding semiconductor switching element group 3U and the corresponding semiconductor switching element group 3D to each other in series are provided, in a positive-negative interval of the DC power storage unit 1, to respective phases which are a u phase, a v phase, and a w phase.

Connection points, for the respective phases, between the semiconductor switching element groups 3U at upper arms of the leg circuits 4 and the semiconductor switching element groups 3D at lower arms of the leg circuits 4 are AC input/output terminals Vu, Vv, and Vw for the three phases, and phases of the motor 5 are respectively connected to the AC input/output terminals Vu, Vv, and Vw.

In an input stage of the inverter circuit 30, a smoothing capacitor 2 which eliminates voltage ripple and noise from a DC voltage outputted from the DC power storage unit 1 is provided in parallel to the DC power storage unit 1.

In addition, a voltage sensor circuit SV1 is provided in parallel to the smoothing capacitor 2.

The voltage sensor circuit SV1 detects an input voltage Vin which is inputted to the inverter circuit 30 and which is a voltage between both ends of the smoothing capacitor 2, and inputs the detected input voltage Vin via a signal wire 41 to the control unit 50.

In addition, current sensor circuits SC1, SC2, and SC3 for detecting output currents Iu, Iv, and Iw, for the respective phases, from the inverter circuit 30 are provided to the respective phases in an output stage of the inverter circuit 30. The current sensor circuits SC1, SC2, and SC3 detect the output currents Iu, Iv, and Iw flowing between the motor 5 and the input/output terminals Vu, Vv, and Vw for the three phases, and input the detected output currents Iu, Iv, and Iw via signal wires 42$u$, 42$v$, and 42$w$ to the control unit 50.

In addition, a rotation angle sensor Sns$\theta$m (not shown) for detecting a rotation angle $\theta$m of the motor 5 is provided to the motor 5. The rotation angle sensor Sns$\theta$m inputs the detected rotation angle $\theta$m of the motor 5 via a signal wire 43 to the control unit 50.

A torque command value Trq* for the motor 5 and a DC voltage command value Vin* for the input voltage Vin to be inputted to the inverter circuit 30 are inputted to the control unit 50 from a higher-order control device (not shown) or the like.

Then, the control unit 50 performs control so as to switch the semiconductor switching element groups 3 for the phases via control wires 40 (40Uu, 40Du, 40Uv, 40Dv, 40Uw, and 40Dw) at intervals of a set dead time on the basis of: the torque command value Trq* and the DC voltage command value Vin* which have been inputted; and the input voltage Vin, the output currents Iu, Iv, and Iw, and the rotation angle θm which have been acquired from the respective sensor circuits.

The control wires 40 (40Uu, 40Du, 40Uv, 40Dv, 40Uw, and 40Dw) are respectively provided to the semiconductor switching element groups 3.

Specifically, the control unit 50 performs control so as to switch the semiconductor switching element group 3U at the upper arm for the u phase via the control wire 40Uu and performs control so as to switch the semiconductor switching element group 3D at the lower arm for the u phase via the control wire 40Du.

Further, the control unit 50 performs control so as to switch the semiconductor switching element group 3U at the upper arm for the v phase via the control wire 40Uv and performs control so as to switch the semiconductor switching element group 3D at the lower arm for the v phase via the control wire 40Dv.

Further, the control unit 50 performs control so as to switch the semiconductor switching element group 3U at the upper arm for the w phase via the control wire 40Uw and performs control so as to switch the semiconductor switching element group 3D at the lower arm for the w phase via the control wire 40Dw.

Thus, the inverter circuit 30 converts, through control by the control unit 50, the DC voltage at the smoothing capacitor 2 into a three-phase AC voltage and supplies the three-phase AC voltage via the output terminals Vu, Vv, and Vw for the three phases to the motor 5.

It is noted that a power storage device such as a battery may be used as the DC power storage unit 1 serving as a DC circuit.

In the case where the power conversion apparatus 100 is applied to a powertrain for an electric automobile, a hybrid automobile, or the like, the DC power storage unit 1 is representatively formed as a secondary battery such as a nickel hydrogen battery or a lithium ion battery.

Although the motor which is an electric motor has been described above as an AC circuit, the AC circuit may be a power generator. In this case, power may be stored from the power generator serving as an AC circuit via the inverter circuit 30 to the DC power storage unit 1 serving as a DC circuit.

Next, the semiconductor switching element groups 3 (3U and 3D) as parallel circuits will be described with reference to FIG. 1.

It is noted that, in each leg circuit 4 of the inverter circuit 30, the semiconductor switching element group 3U forming the upper arm and the semiconductor switching element group 3D forming the lower arm have the same configuration, but, in the case where the semiconductor switching element groups at the upper arm and the lower arm are described so as to be distinguished from each other, the semiconductor switching element groups are denoted by different reference characters to be described as the semiconductor switching element group 3U and the semiconductor switching element group 3D.

As shown in FIG. 1, the semiconductor device 20 according to the present embodiment includes: a gate driver circuit 15; and the semiconductor switching element group 3 (3U, 3D).

The semiconductor switching element group 3 (3U, 3D) is formed by connecting a plurality of power modules 10 (10a and 10b) in parallel. In the semiconductor switching element group 3 (3U, 3D) in the present embodiment, two power modules 10, i.e., the power module 10a and the power module 10b, are connected in parallel.

A connection point between drain terminals in the power modules 10a and 10b is defined as a PU connection point serving as a first connection point. A connection point between source terminals in the power modules 10a and 10b is defined as the relevant one of the aforementioned output terminals Vu, Vv, and Vw for the three phases serving as a second connection point.

In FIG. 1, the phase of an arm of the power module 10a on the left side is defined as a phase A, and the phase of an arm of the power module 10b on the right side is defined as a phase B.

It is noted that each of the power modules 10a and 10b is, for example, a discrete-type package part accommodating therein a MOSFET 11 serving as a semiconductor switching element.

Alternatively, the semiconductor switching element group 3 may have a configuration in which three or more power modules 10 are connected in parallel. The number of the power modules 10 connected in parallel only has to be set according to a power capacity for processing.

Although a configuration in which one MOSFET 11 is accommodated in each of the power modules 10 (10a and 10b) has been described, it is also possible to employ, for example, a configuration in which a plurality of the MOSFETs 11 are accommodated or a configuration in which another semiconductor element such as a resistor is accommodated in addition to the MOSFET 11.

A drain terminal serving as a second electrode of the MOSFET 11 in the power module 10a for the phase A, and a drain terminal serving as a second electrode of the MOSFET 11 in the power module 10b for the phase B, are connected to each other. Further, a source terminal serving as a third electrode of the MOSFET 11 in the power module 10a for the phase A, and a source terminal serving as a third electrode of the MOSFET 11 in the power module 10b for the phase B, are connected to each other.

Furthermore, the gate driver circuit 15 is connected to a gate terminal serving as a first terminal of each of the power modules 10a and 10b via a corresponding one of gate resistances 10Ra and 10Rb, and controls the voltage between the gate terminal and the source terminal.

Thus, each MOSFET 11 is controlled, according to the voltage between the gate terminal and the source terminal controlled by the gate driver circuit 15, to attain conduction or non-conduction between the drain terminal and the source terminal.

It is noted that the gate driver circuit 15 is formed so as to be incorporated in the control unit 50 shown in FIG. 2, and thus is not shown in FIG. 2.

Although the MOSFET has been described above as a semiconductor switching element used for the inverter circuit 30, the semiconductor switching element is not limited to MOSFET. For example, an IGBT and a diode Di connected in antiparallel to the IGBT may be used as semiconductor switching elements.

Here, the inventors of the present disclosure focused on the fact that, in a semiconductor device in which a plurality of power modules were connected in parallel in this manner, a semiconductor switching element (MOSFET) included in any of the power modules experienced an operational defect such as an erroneous turn-on operation. The inventors conducted thorough researches in order to solve the defect, and as a result, have found that the cause of inducing the defect is a resonance phenomenon, between the power modules 10, that occurs when there is a difference in switching timing between the power modules 10 as described below.

Hereinafter, a mechanism of an operational defect such as an erroneous turn-on operation, in a MOSFET, that occurs owing to a configuration in which the plurality of power modules 10 are connected in parallel, will be described. Thereafter, a measure conceived by the inventors will be described.

Figure 3:
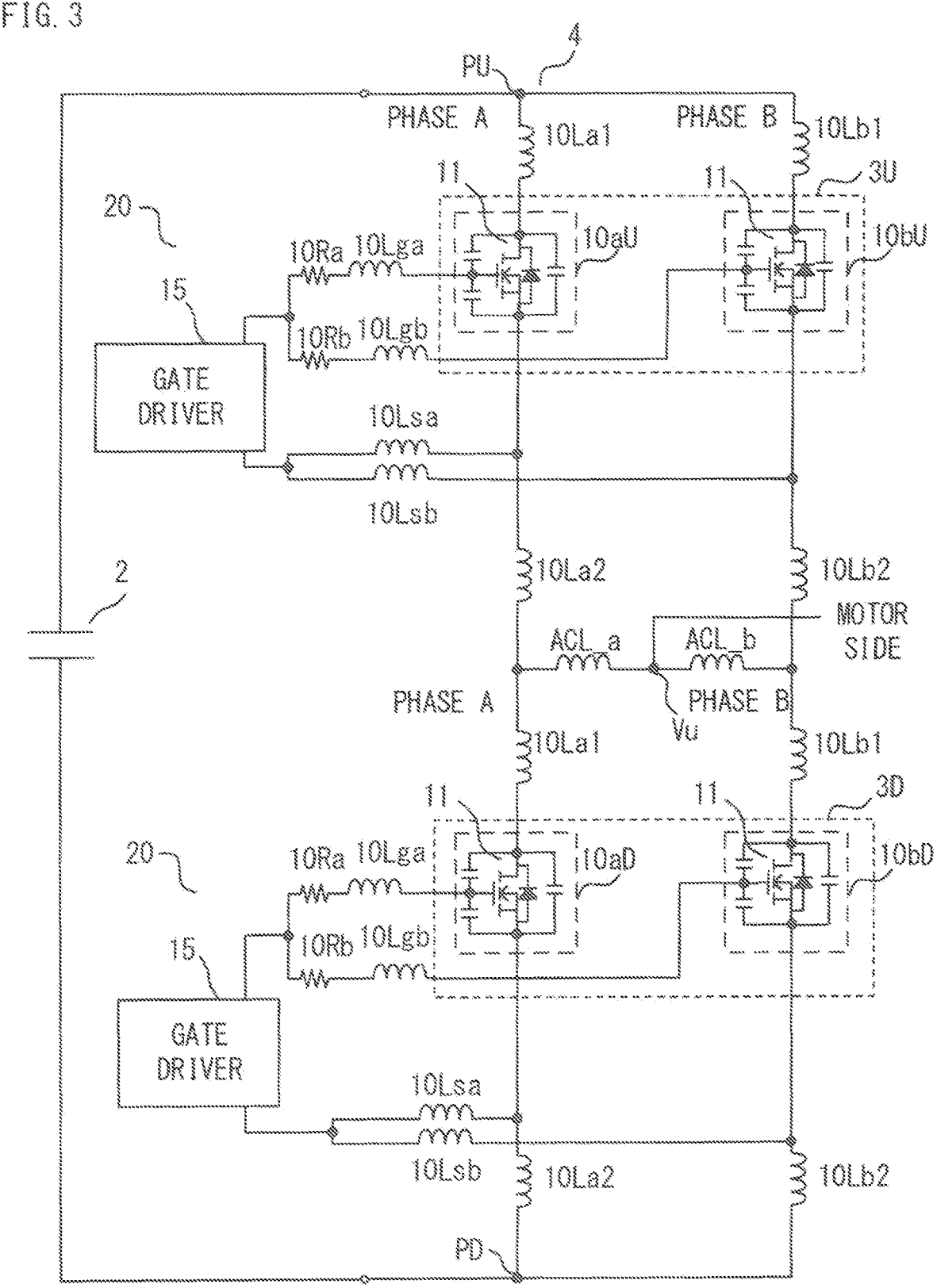
FIG. 3 is a diagram showing a detailed configuration of a semiconductor switching element group of the semiconductor device according to the first embodiment.

FIG. 3 is a diagram showing a detailed configuration of the semiconductor switching element groups 3 (3U and 3D) of the leg circuit 4 for the u phase, in the inverter circuit 30 of the power conversion apparatus 100 according to the present first embodiment.

It is noted that the inside of the semiconductor switching element group 3U at the upper arm and the inside of the semiconductor switching element group 3D at the lower arm have the same configuration as described above. However, in the drawings used in the following descriptions, the power modules 10*a* and 10*b* in the semiconductor switching element group 3U at the upper arm are referred to as power modules 10*a*U and 10*b*U, and the power modules 10*a* and 10*b* in the semiconductor switching element group 30 at the lower arm are referred to as power modules 10*a*D and 10*b*D, for easy distinguishment therebetween.

Further, resistance components and inductance components on respective wires are written as below.

10Ra and 10Rb: gate resistances of the respective MOSFETs 11 in the power modules 10*a*U (10*a*D) and 10*b*U (10*b*D).

10Lga and 10Lgb: inductance components on a gate line serving as a first path and connecting the gate terminal of the MOSFET 11 in the power module 10*a*U (10*a*D) and the gate terminal of the MOSFET 11 in the power module 10*b*U (10*b*D) to each other. The gate line is connected to the gate driver circuit 15.

10La1 and 10Lb1: inductance components on a drain line serving as a second path and connecting the drain terminal of the MOSFET 11 in the power module 10*a*U (10*a*D) and the drain terminal of the MOSFET 11 in the power module 10*b*U (10*b*D) to each other.

10Lsa and 10Lsb: inductance components on a control source line serving as a third path and connecting the source terminal of the MOSFET 11 in the power module 10*a*U (10*a*D) and the source terminal of the MOSFET 11 in the power module 10*b*U (10*b*D) to each other. The control source line is connected to the gate driver circuit 15.

10La2 and 10Lb2, ACL_a and ACL_b: inductance components on a main-circuit source line, for the power modules 10*a* and 10*b*, serving as a third path and connecting the source terminal of the MOSFET 11 in the power module 10*a*U (10*a*D) and the source terminal or the MOSFET 11 in the power module 10*b*U (10*b*D) to each other.

It is noted that the main-circuit source line at the upper arm is connected via the AC input/output terminal Vu to the motor 5, and the main-circuit source line at the lower arm is connected via a connection point PD serving as a second connection point to a negative electrode side of the smoothing capacitor 2.

It is noted that the gate resistances 10Ra and 10Rb may include wire resistances.

In addition, each inductance component may include not only an inductance of a part such as a reactor but also a parasitic inductance component.

Further, as shown in FIG. 3, a parasitic capacitance is present between the drain and the source, between the drain and the gate, and between the gate and the source in each power module 10. Hereinafter, an example of a mechanism in which a resonance occurs between the power modules 10 in the semiconductor switching element group 3U at the upper arm when the semiconductor switching element group 3D at the lower arm is turned on, will be described with reference to FIG. 4 to FIG. 9.

FIG. 4 to FIG. 9 are each a diagram for explaining the resonance occurring between the power modules 10 for the phase A and the phase B, in the semiconductor device 20 according to the present first embodiment.

Figure 4:
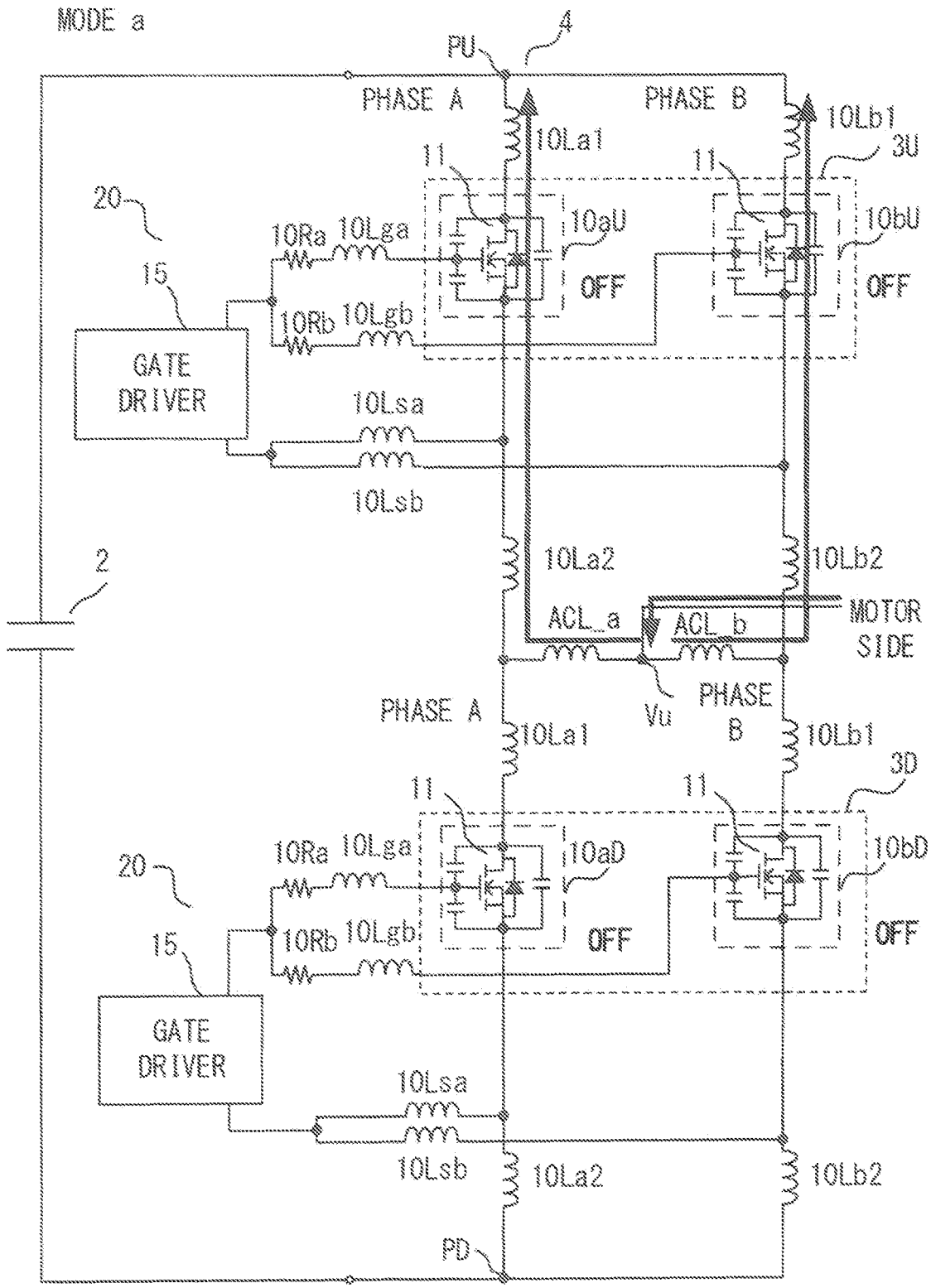
FIG. 4 is a diagram for explaining a resonance between semiconductor switching elements in the semiconductor device according to the first embodiment.

Operation Mode Shown in FIG. 4 (MODE a)

A state is assumed in which, in the semiconductor switching element group 3U at the upper arm and the semiconductor switching element group 3D at the lower arm, each of the MOSFETs 11 at the upper and lower arms is in an OFF state, and current is flowing in from the motor 5 in the output stage of the inverter circuit 30. In this state, the current having flowed in from the motor 5 side flows via an internal diode of each MOSFET 11 in the semiconductor switching element group 3U at the upper arm, from the source terminal side to the drain terminal side.

Figure 5:
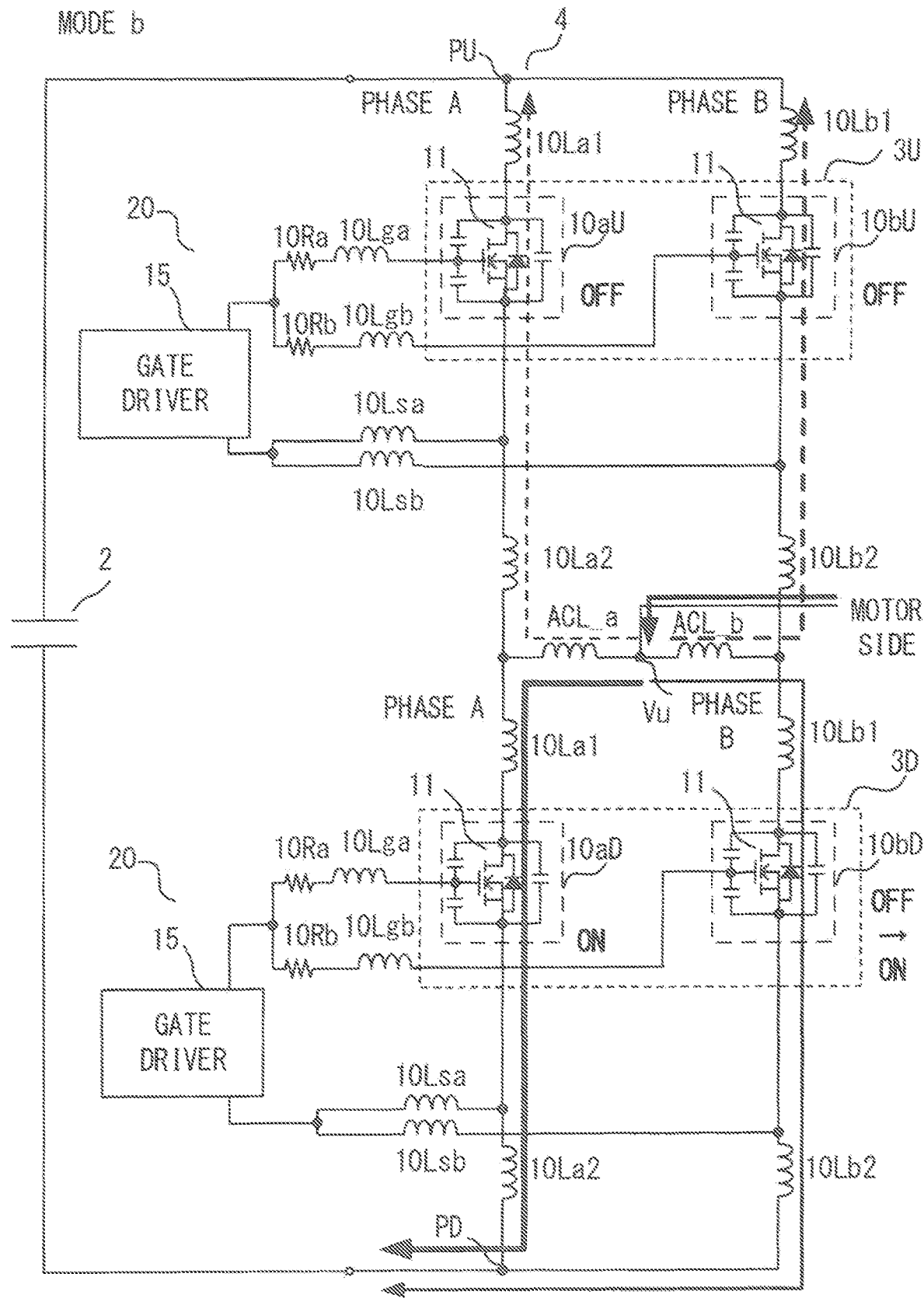
FIG. 5 is a diagram for explaining the resonance between the semiconductor switching elements in the semiconductor device according to the first embodiment.

Operation Mode Shown in FIG. 5 (MODE b)

The MOSFETs 11 in the semiconductor switching element group 3D at the lower arm are turned on.

Here, it is assumed that, in the semiconductor switching element group 3D at the lower arm, the MOSFET 11 in the power module 10*b*D for the phase B is turned on later than the MOSFET 11 in the power module 10*a*D for the phase A owing to influences such as difference in characteristics and variation in inductance between the power modules 10*a*D and 10*b*D. Therefore, a drain current of the MOSFET 11 in the power module 10*a*D for the phase A is higher than a drain current of the MOSFET 11 in the power module 10*b*D for the phase B. Meanwhile, in the semiconductor switching element group 3U at the upper arm, a current flowing in an internal diode of the MOSFET 11 in the power module 10*a*U for the phase A is lower than a current flowing in an internal diode of the MOSFET 11 in the power module 10*b*U for the phase B. Consequently, at the upper arm, the current flowing in the power module 10*a*U for the phase A becomes 0 earlier, and recovery occurs.

Figure 6:
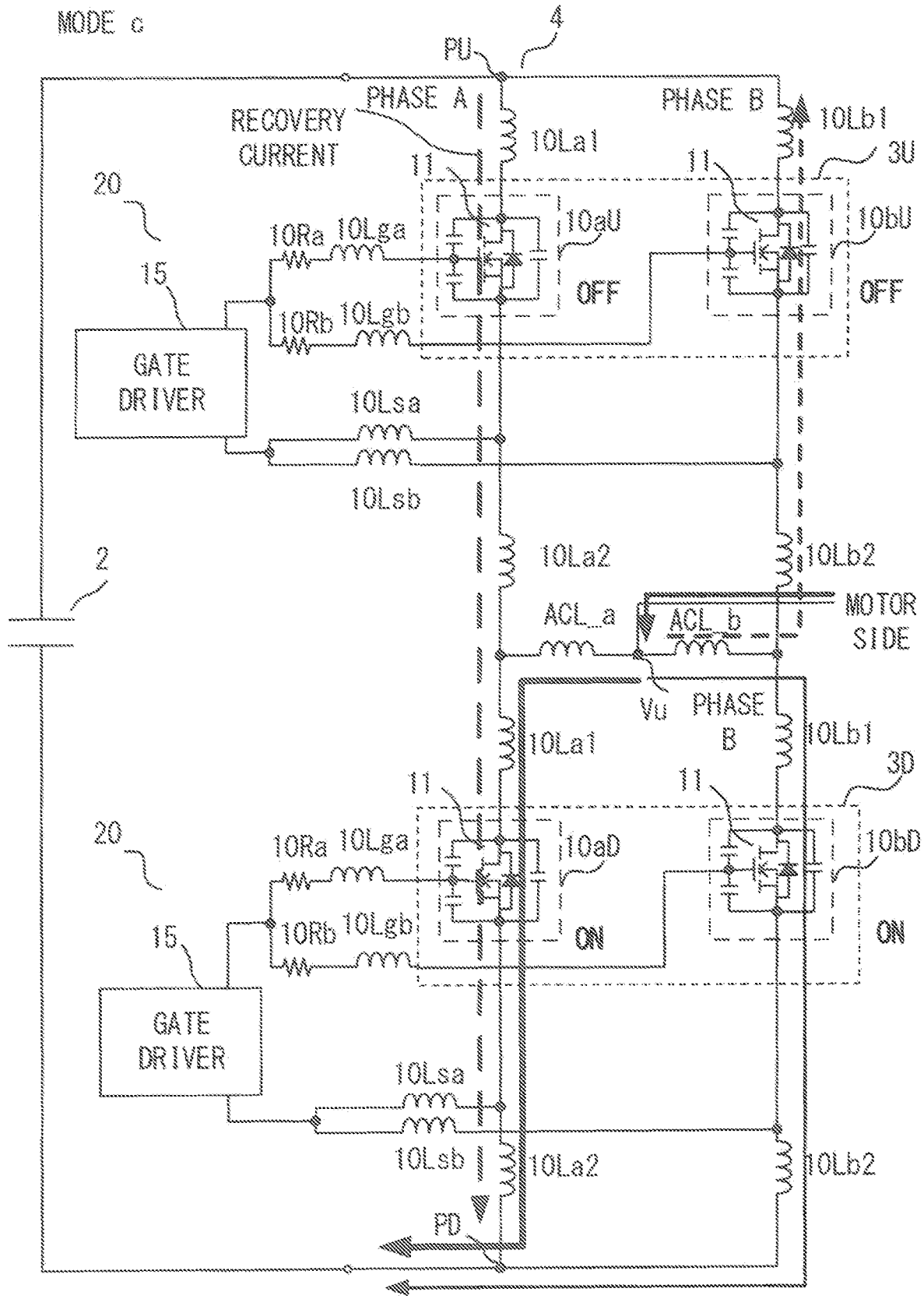
FIG. 6 is a diagram for explaining the resonance between the semiconductor switching elements in the semiconductor device according to the first embodiment.

Operation Mode Shown in FIG. 6 (MODE c)

In the semiconductor switching element group 3U at the upper arm, recovery occurs at the internal diode of the power module 10*a*U for the phase A, and thus recovery current flows on the phase A side. At this time, no recovery occurs at the internal diode of the power module 10*b*U for the phase B, and the internal diode of the power module 10*b*U for the phase B is in a conducting state.

Figure 7:
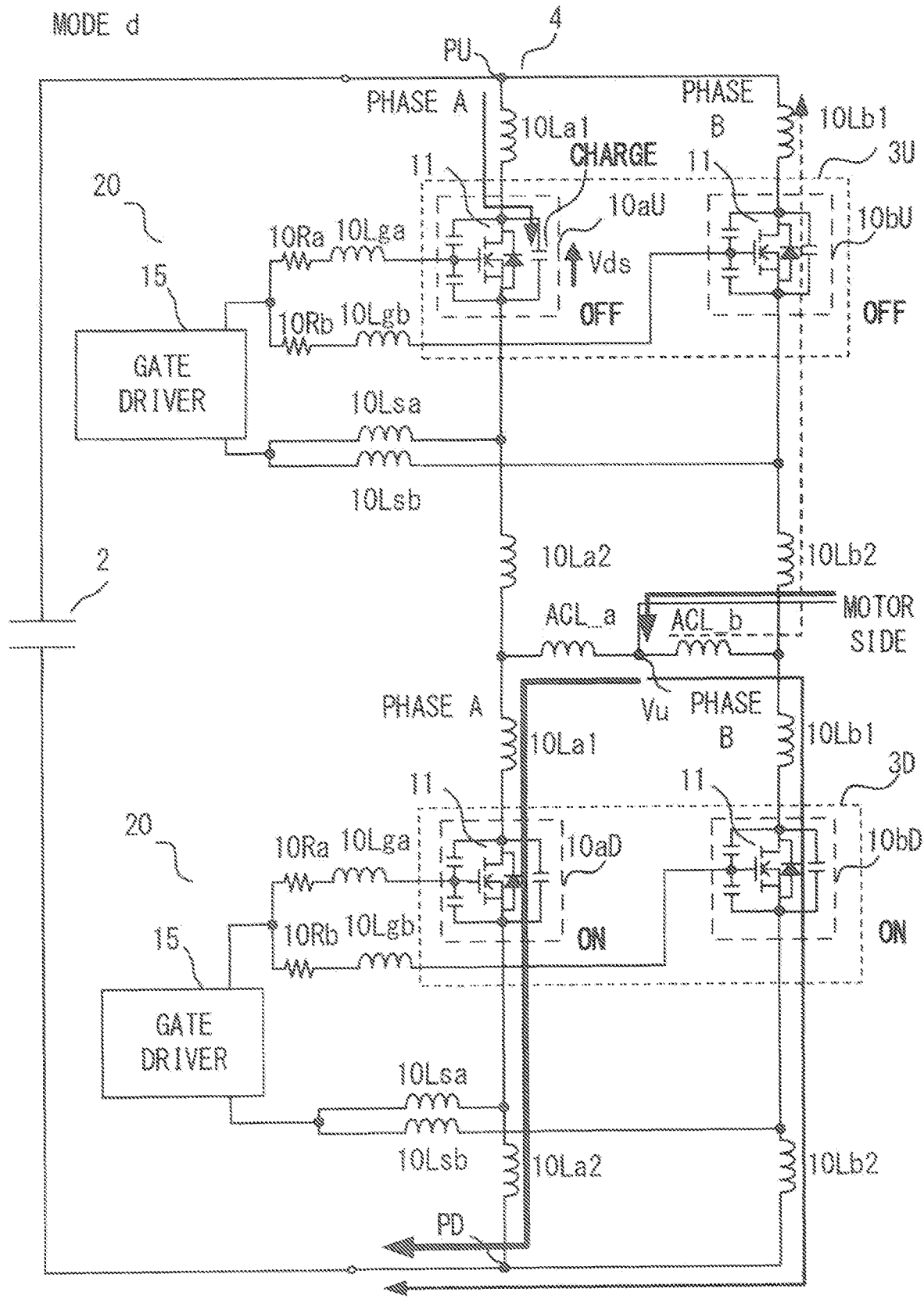
FIG. 7 is a diagram for explaining the resonance between the semiconductor switching elements in the semiconductor device according to the first embodiment.

Operation Mode Shown in FIG. 7 (MODE d)

After the recovery at the internal diode of the power module 10*a*U for the phase A of the semiconductor switching element group 3U at the upper arm, the parasitic capacitance between the drain and the source of the MOSFET 11 in the power module 10*a*U for the phase A is charged so that a voltage Vds between the drain and the source increases. Meanwhile, the internal diode of the power module 10*b*U for the phase B of the semiconductor switching element group 3U at the upper arm is in a conducting state so that a voltage Vds between the drain and the source is about 0 V.

At this time, a potential difference is generated between the power module 10*a*U for the phase A and the power module 10*b*U for the phase B. That is, the voltage Vds between the drain and the source in the power module 10*a*U for the phase A is in a state of being higher than the voltage Vds between the drain and the source in the power module 10*b*U for the phase B.

Figure 8:
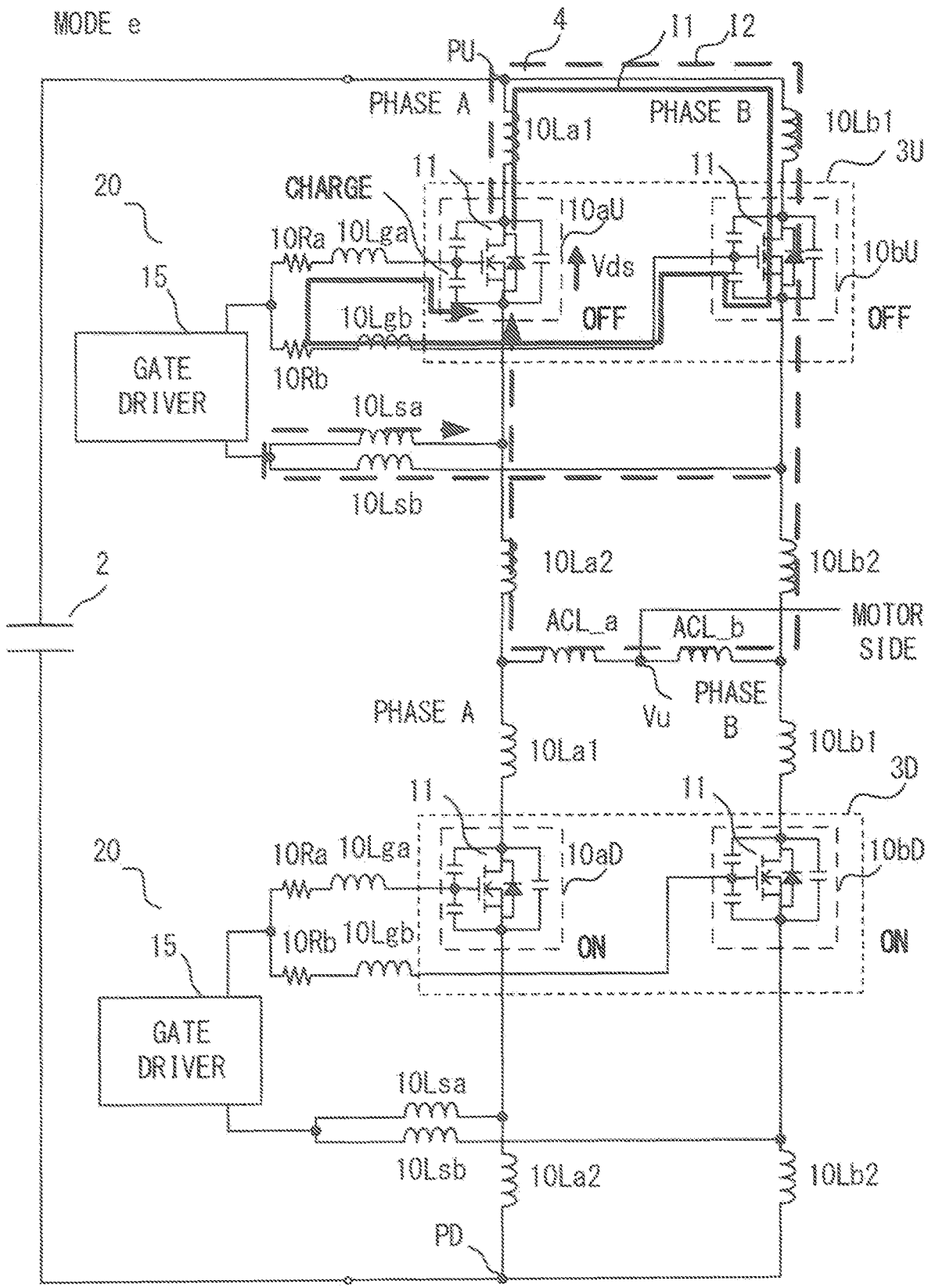
FIG. 8 is a diagram for explaining the resonance between the semiconductor switching elements in the semiconductor device according to the first embodiment.

Operation Mode Shown in FIG. 8 (MODE e)

In the semiconductor switching element group 3U at the upper arm, the voltage Vds between the drain and the source of the MOSFET 11 in the power module 10aU for the phase A has increased, and the potential difference has been generated with respect to the phase B. Thus, currents I1 and I2 which are resonance currents flow from the phase A to the phase B.

The current I1 passes through the MOSFET 11 in the power module 10bU for the phase B from the drain terminal of the MOSFET 11 in the power module 10aU for the phase A, and flows through the gate line that is a portion common to the power modules 10aU and 10bU.

The current I2 passes through the MOSFET 11 in the power module 10bU for the phase B from the drain terminal of the MOSFET 11 in the power module 10aU for the phase A and flows through the main-circuit source line (a path extending via the AC input/output terminal Vu) and the control source line (a path connected to the gate driver circuit 15).

It is noted that, for simplification of explanations, turn-on current flowing through the MOSFET 11 in the semiconductor switching element group 3D at the lower arm is neither shown nor described.

Figure 9:
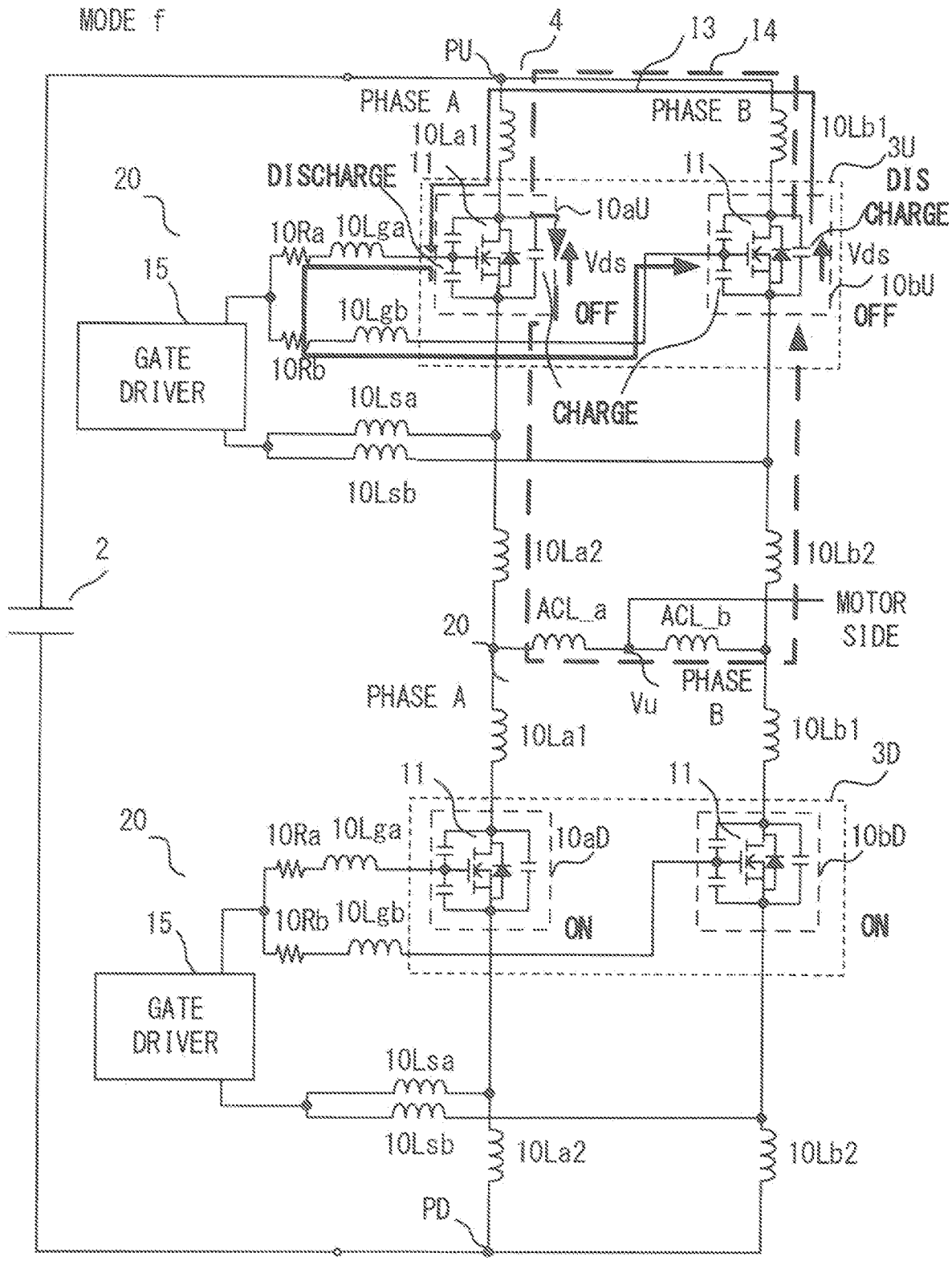
FIG. 9 is a diagram for explaining the resonance between the semiconductor switching elements in the semiconductor device according to the first embodiment.

Operation Mode Shown in FIG. 9 (MODE f)

Recovery of the internal diode of the power module 10aU for the phase A of the semiconductor switching element group 3U at the upper arm is completed, the parasitic capacitance between the drain and the source of the MOSFET 11 in the power module 10bU for the phase B starts to be visually recognizable, and this capacitance is charged with current having been kept flowing until immediately before the capacitance starts to be visually recognizable.

Then, the voltage Vds between the drain and the source of the MOSFET 11 in the power module 10bU for the phase B increases, and a potential difference is generated with respect to the phase A. Thus, currents I3 and I4 flow from the phase B to the phase A.

The current I3 passes through the MOSFET 11 in the power module 10aU for the phase A from the drain terminal of the MOSFET 11 in the power module 10bU for the phase B and flows through the gate line that is a portion common to the power modules 10aU and 10bU.

The current I4 passes through the MOSFET 11 in the power module 10aU for the phase A from the drain terminal of the MOSFET 11 in the power module 10bU for the phase B and flows through the main-circuit source line (the path extending via the AC input/output terminal Vu).

Thereafter, a resonance occurs between parasitic capacitances in the power module 10aU for the phase A and the power module 10bU for the phase B.

Specifically, the state of the capacitance between the drain and the source of the MOSFET 11 in the power module 10aU for the phase A shown in FIG. 9 is changed from a discharged state to a charged state, and the state of the capacitance between the drain and the source of the MOSFET 11 in the power module 10bU for the phase B is changed from a charged state to a discharged state. Meanwhile, the state of the capacitance between the gate and the source of the MOSFET 11 in the power module 10bU for the phase B is changed from a discharged state to a charged state, and the capacitance between the gate and the source of the MOSFET 11 in the power module 10aU for the phase A is changed from a charged state to a discharged state.

In addition, a resonance occurs not only between the parasitic capacitances for the phase A and the phase B in the semiconductor switching element group 3U at the upper arm but also between the semiconductor switching element group 3U at the upper arm and the smoothing capacitor 2.

It is noted that, for simplification of explanations, turn-on current flowing through the semiconductor switching element group 3D at the lower arm is neither shown nor described here as well.

As described above, if the switching timing of the MOSFET 11 differs between the power modules 10a and 10b connected in parallel, a potential difference is generated between the power modules 10a and 10b, and a resonance phenomenon occurs owing to the parasitic capacitances of the MOSFETs 11 in the power modules 10a and 10b and the inductance components between the power modules 10a and 10b.

The inventors of the present disclosure have found that the resonance currents lead to increase in the gate voltage of each MOSFET 11 so that an erroneous turn-on operation is induced with respect to the MOSFET 11.

This problem particularly prominently arises in the case where switching at a high rate of di/dt (high-speed switching) is performed in order to reduce loss.

Hereinafter, a state where an erroneous turn-on operation is induced with respect to each MOSFET 11 will be described with reference to a waveform diagram showing voltages in the MOSFETs 11.

Figure 10:
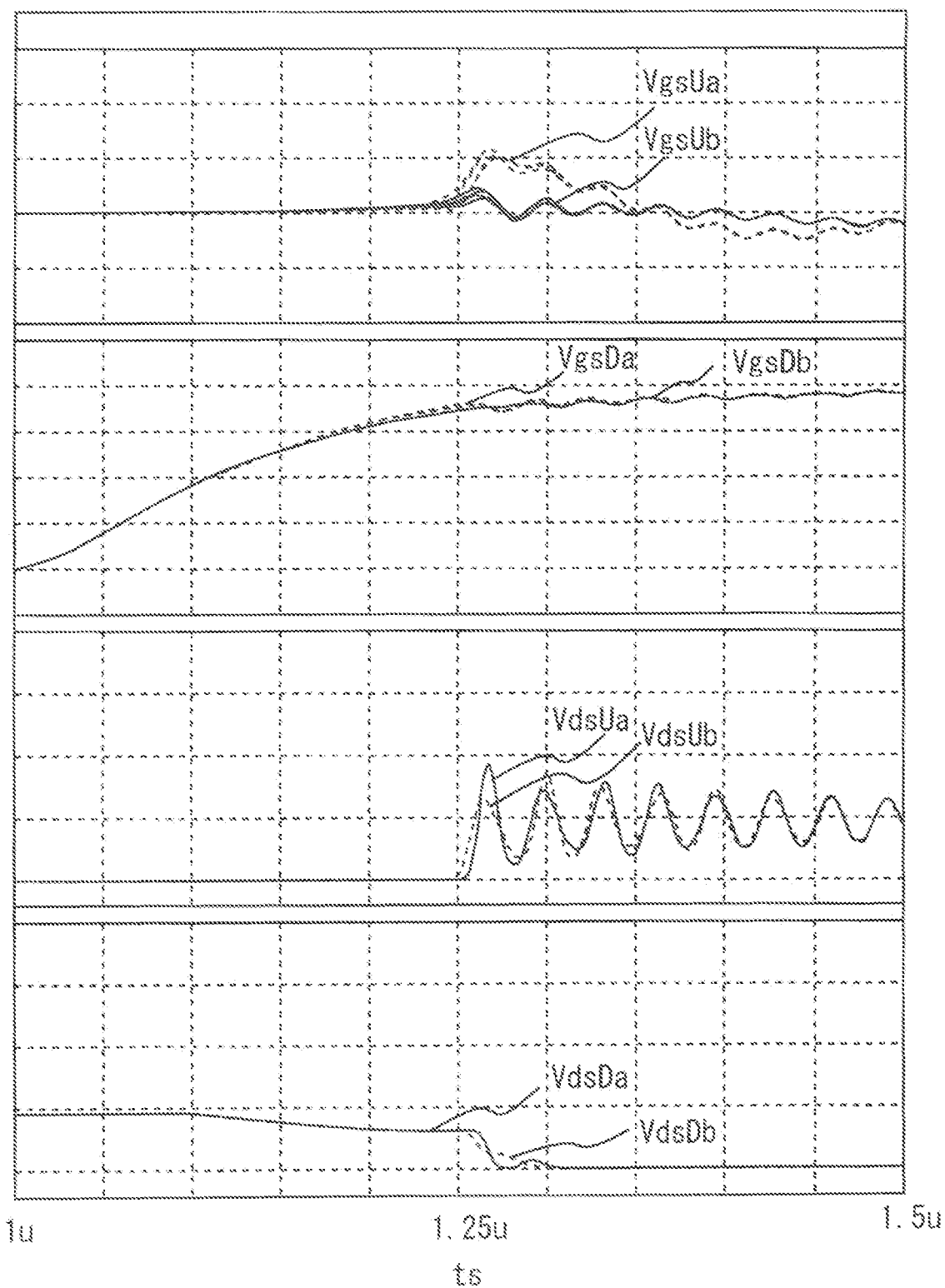
FIG. 10 is a waveform diagram for explaining the resonance between the semiconductor switching elements in the semiconductor device according to the first embodiment.

FIG. 10 is a waveform diagram for explaining voltages at parasitic capacitances of the MOSFETs 11 in the case of the aforementioned "MODE e" shown in FIG. 8. The waveforms indicate the following voltages.

VgsUa: the voltage between the gate and the source of the MOSFET 11 in the power module 10aU at the upper arm.

VgsUb: the voltage between the gate and the source of the MOSFET 11 in the power module 10bU at the upper arm.

VgsDa: the voltage between the gate and the source of the MOSFET 11 in the power module 10aD at the lower arm.

VgsDb: the voltage between the gate and the source of the MOSFET 21 in the power module 10bD at the lower arm.

VdsUa: the voltage between the drain and the source of the MOSFET 11 in the power module 10aU at the upper arm.

VdsUb: the voltage between the drain and the source of the MOSFET 11 in the power module 10bU at the upper arm.

VdsDa: the voltage between the drain and the source of the MOSFET 11 in the power module 10aD at the lower arm.

VdsDb: the voltage between the drain and the source of the MOSFET 11 in the power module 10bD at the lower arm.

It is seen that, at t=1.25 µs, there is an increase in the voltage VgsUa between the gate and the source of the MOSFET 11 in the power module 10aU, at the upper arm, for the phase A in which recovery has occurred first. At this time, since the voltage VgsUa between the gate and the source in the power module 10aU for the phase A increases, a gate lift occurs. Thus, it is seen that, if the voltage VgsUa between the gate and the source exceeds a threshold value, an erroneous turn-on operation occurs.

Hereinafter, a measure against the above problem in the semiconductor device 20 according to the present first embodiment will be described.

Regarding the operation modes respectively explained with reference to FIG. 4 to FIG. 9, in order to reduce the gate lift between the MOSFETs 11, it is important to reduce the current I1 that is generated in the operation mode shown in FIG. 8 (MODE e) and that flows through the gate line.

Here, the operation mode shown in FIG. 9 (MODE f) involves a resonance between parasitic capacitances (capacitors) having occurred owing to inertia after a potential difference is generated between the phase A and the phase B, and thus the cause of the resonance is this resonance current generated in the operation mode shown in FIG. 8 (MODE e).

In order to reduce the current I1 that charges a gate capacitance of each MOSFET 11 and that is generated in the operation mode shown in FIG. 8 (MODE e), the semiconductor device 20 according to the present first embodiment is configured to satisfy a first condition that an impedance Zg on the gate line that serves as the first path and that is a resonance path between the power modules 10a and 10b is higher, by at least a preset value Sv, than an impedance Zs on each of the source lines (the control source line and the main-circuit source line) serving as the third paths.

Here, the impedance Zg on the gate line is expressed as 10Ra+10Lga+10Rb*20Lgb.

If an impedance on the main-circuit source line is defined as 10La2+10Lb2+ACL_a+ACL_b and an impedance on the control source line is defined as 10Lsa+10Lsb, the impedance Zs on the source lines is expressed as a combined impedance thereof, i.e., 10Lsa+10Lsb//10La2+10Lb2+ACL_a*ACL_b.

That is, is the operation mode in FIG. 8 (MODE e), the amount of a current that branches to the gate line side or the source line side after flowing from the parasitic capacitance between the drain and the source of the MOSFET 11 in the power module 10aU for the phase A and passing through the power module 10bU for the phase B, is determined according to an impedance ratio. Here, it is assumed that the MOSFET 11 in the power module 10bU has a sufficiently high input capacitance Ciss and a negligibly low impedance $1/j\omega C$.

Therefore, if the semiconductor device 20 is configured to satisfy the first condition that the impedance Zg on the gate line is higher, by at least the set value Sv, than the impedance Zs on the source lines as described above, the amount of a current flowing to the gate line side is reduced. Consequently, the amount of a gate lift that occurs by charging the gate capacitance can be reduced.

Figure 11:
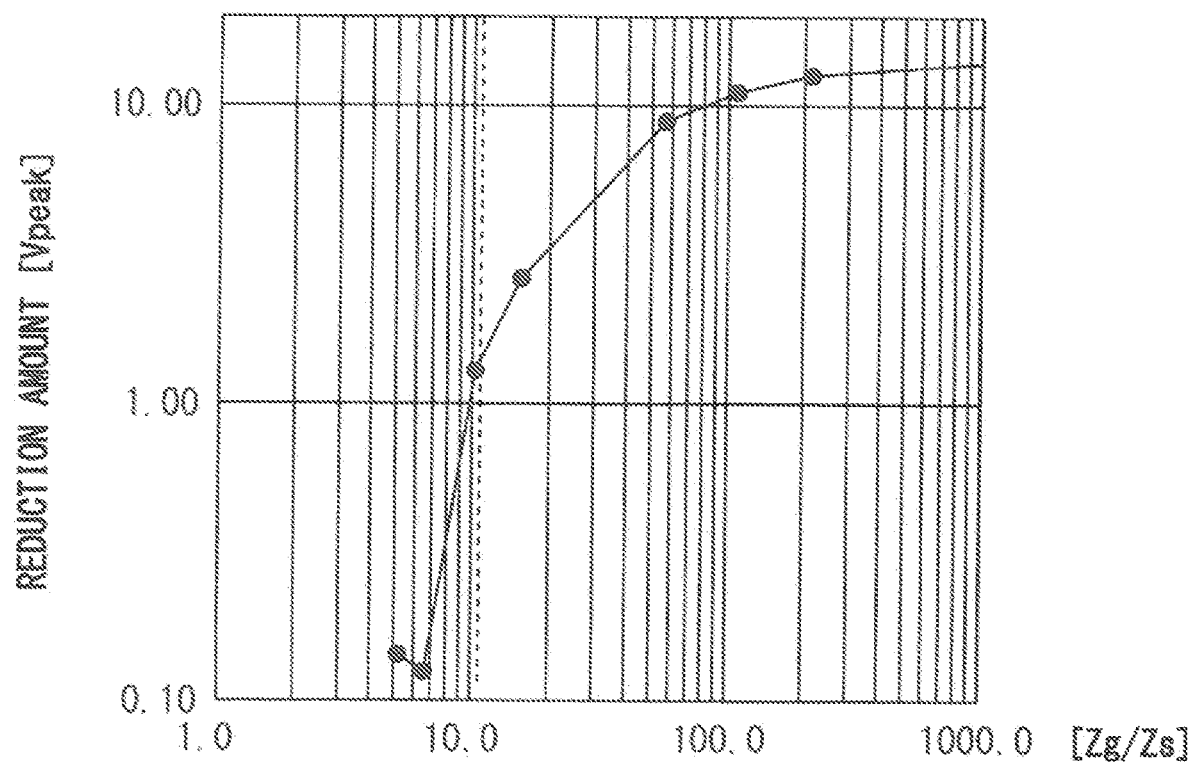
FIG. 11 is a diagram for explaining the reduction amount of as gate lift between the semiconductor switching elements in the semiconductor device according to the first embodiment.

FIG. 11 shows a relationship between the reduction amount of the gate lift, and a ratio (Zg/Zs) of the impedance Zg on the gate line to the impedance Zs on the source lines, in the case where the impedance Zg is increased under a certain set condition. A frequency at this time is regarded as a resonance frequency. In $Z=R+j\omega L$, $\omega$ represents a resonance angular frequency.

From FIG. 11, it is seen that an advantageous effect of gate lift reduction is obtained by setting the impedance Zg on the gate line to be at least ten times as high as the impedance Zs on the source lines.

Considering this, in the power conversion apparatus according to the first embodiment, the impedance Zg on the gate line is set to be at least ten times as high as the impedance Zs on the source lines.

That is, the set value Sv in the above first condition is indicated as a multiplication value (Zg/Zs), for the impedance Zg on the gate line, relative to the impedance Zs on the source lines, and the multiplication value is set to 10.

Figure 12:
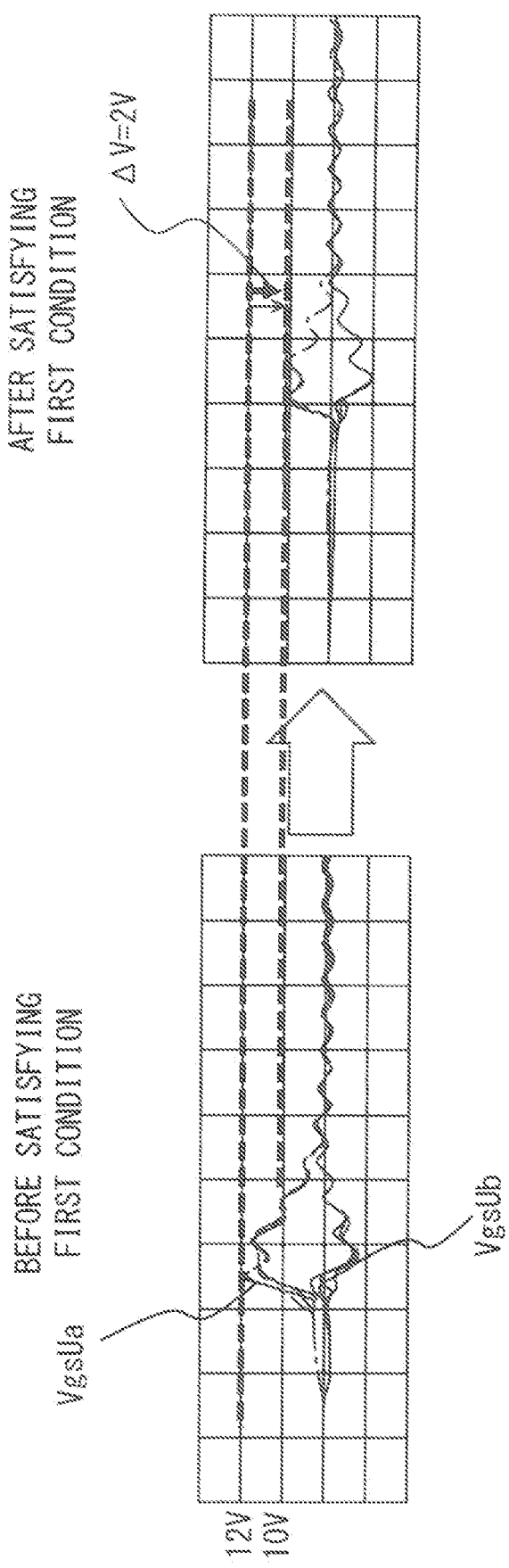
FIG. 12 is a waveform diagram for explaining the reduction amount of a gate lift between the semiconductor switching elements in the semiconductor device according to the first embodiment.

FIG. 12 is a waveform diagram for explaining the reduction amount of a gate lift between the semiconductor switching elements in the semiconductor device 20 according to the present first embodiment. The waveforms indicate the following voltages.

VgsUa: the voltage between the gate and the source of the MOSFET 11 in the power module 10aU at the upper arm.

VgsDa: the voltage between the gate and the source of the MOSFET 11 in the power module 10aD at the lower arm.

It is noted that the reason why a plurality of waveforms are shown as each of VgsUa and VgsDa is because an experiment was performed with three or more power modules 10 being connected in parallel.

As shown in FIG. 12, it is seen that the voltage between the gate and the source of the MOSFET 11 in the power module 10aU at the upper arm is reduced from a peak value of 12 V to 10 V so that a reduction amount $\Delta V$ of 2 V was obtained.

Further, in the semiconductor device 20 according to the present embodiment, the above first condition is satisfied on the basis of an impedance at a resonance frequency f0 in a series resonance circuit including components on the path of the current I1 described regarding the operation mode in FIG. 8 (MODE e). The components are: the inductance components 10La1 and 10Lb1 on the drain line between the drain terminals of the MOSFETs 11 in the power modules 10aU and 10bU for the phase A and the phase B; the inductance components 10Lga and 10Lgb on the gate line; resistance components as the gate resistances 10Ra and 10Rb; and capacitance components of the MOSFETs 11.

That is, the impedance on the gate line and the impedance on the source lines are adjusted so as to, when I1 which is a resonance current flows, satisfy the above first condition even at the resonance frequency f0 at which an impedance for the resonance current becomes minimum. Consequently, the above first condition is satisfied even under a condition that the impedance is reduced most. This makes it possible to constantly reduce a gate lift between the MOSFETs 11 and inhibit an operational defect regardless of the frequency of the resonance current.

It is noted that, in the resonance path through which the current I1 flows, recovery has not yet started at the MOSFET 11 in the power module 10bU for the phase B and the MOSFET 11 is in a conducting state, and thus the only MOSFET 11 capacitance component composing the above resonance circuit is the capacitance of the MOSFET 11 in the power module 10bU for the phase B.

In the present embodiment, adjustment of the impedances on the gate line and the source lines to satisfy the above first condition may be performed by, for example, adjusting a wire resistance through adjustment of the length of a board pattern or may be performed by, for example, providing a part such as a coil.

Here, if, for example, the resistance values of the gate resistances 10Ra and 10Rb are increased in the case of increasing the impedance on the gate line for the purpose of satisfying the above first condition, loss in switching is increased, and a chip size is increased. Considering this, a configuration may be employed in which a ferrite bead that serves as an inductive inductance element and that attains a high impedance at a resonance frequency of the series resonance circuit as a path of the current I1 is provided on each source line as a means for increasing the impedance on the gate line.

If the relationship in magnitude between the impedances on the gate line and the source line is adjusted so as to satisfy the first condition at an impedance at a resonance frequency of the series resonance circuit including the above ferrite bead, the device can be downsized while the first condition can be assuredly satisfied regardless of the frequency of resonance current.

It is noted that a difference in recovery timing between the phase A and the phase B of the semiconductor switching element group 3U at the upper arm has been mainly described above. However, also in the case where a difference in recovery timing is generated in the semiconductor switching element group 3D at the lower arm, the same advantageous effect is exhibited by satisfying the above first condition in the semiconductor device forming the lower arm.

Hereinafter, a semiconductor device 20ex different from the above semiconductor device 20 will be described as a further modification for assuredly satisfying the first condition.

Figure 13:
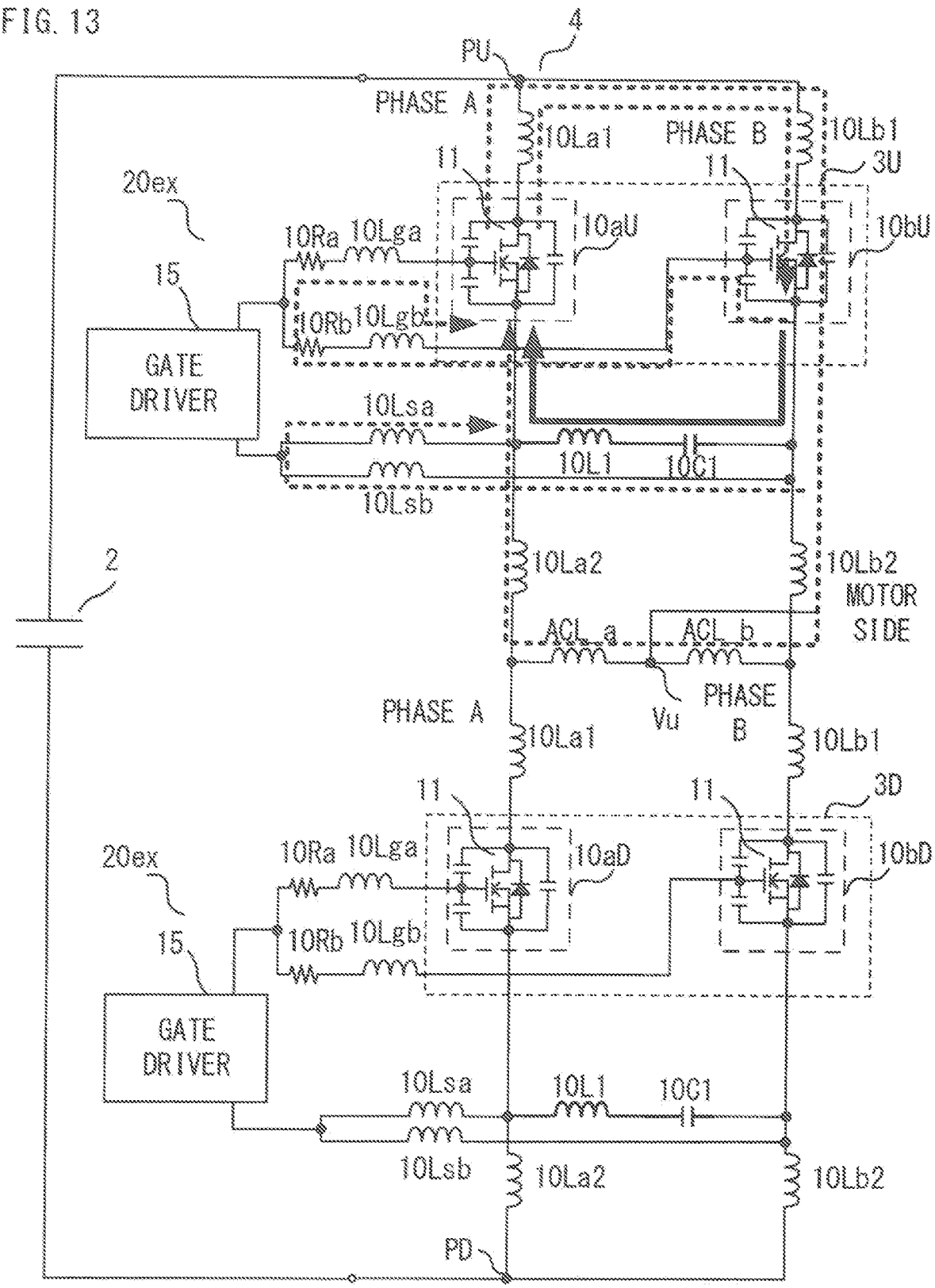
FIG. 13 is a schematic configuration diagram showing a modification of the semiconductor device according to the first embodiment.

FIG. 13 is a schematic configuration diagram showing the semiconductor device 20ex according to the first embodiment.

As shown in FIG. 13, an LC series circuit including a capacitor 10C1 serving as a first capacitance component and an inductance 10L1 serving as a first inductance component is connected in parallel to the source lines, and connection is made between the source terminals of the MOSFETs 11 for the phase A and the phase B via this LC series circuit.

Here, the inductance 10L1 may be a parasitic inductance of a wire pattern on a board or a part such as a reactor.

Here, if the resonance frequency (Z-0) of the LC series circuit is set as a resonance frequency of the current I1 flowing between the power nodules 10aU and 10bU described with reference to FIG. 8, the resonance current flows in the operation mode (MODE e) through the LC series circuit as indicated by a solid-line arrow in FIG. 13. That is, the impedance on the source lines is reduced at a set frequency.

In this manner, the capacitor 10C1 and the inductance 10L1 are adjusted such that an impedance at the LC series circuit is lower than the impedance on the source lines at the resonance frequency of the series resonance circuit. Consequently, the above first condition is satisfied.

A semiconductor device according to the present embodiment configured as described above includes:
  a first circuit including semiconductor switching elements connected in parallel, each semiconductor switching element having a first electrode, a second electrode, and a third electrode and being configured to be controlled, according to a voltage between the first electrode and the third electrode, to attain conduction or non-conduction between the second electrode and the third electrode; and
  a control unit connected to the first electrode of each semiconductor switching element and configured to control the voltage between the first electrode and the third electrode, wherein
  the semiconductor device is configured to satisfy a first condition that an impedance Zg on a first path between the first electrodes of the respective semiconductor switching elements is higher, by at least a set value, than an impedance Zs on a third path making connection between the third electrodes of the respective semiconductor switching elements.

In this manner, the semiconductor device includes the first circuit including the plurality of semiconductor switching elements connected in parallel and the control unit which is a gate driver circuit and which is connected to the first terminal of each semiconductor switching element in the first circuit, and the semiconductor device has a configuration in which the gate driver circuit controls each semiconductor switching element. The semiconductor device is configured to satisfy the first condition that the impedance Zg on a gate line which is the first path between the first electrodes of the respective semiconductor switching elements is higher, by at least the set value, than the impedance Zs on the third path which is a source line making connection between the third electrodes of the respective semiconductor switching elements.

Consequently, even if a resonance occurs between the semiconductor switching elements connected in parallel owing to, for example, variation in recovery timing at the time of switching of the semiconductors connected in parallel, the amount of a resonance current that flows around to reach the gate line can be reduced. Therefore, a gate lift between the semiconductor switching elements can be reduced, and an erroneous turn-on operation can be inhibited.

Here, for example, a configuration is assumed to be employed in which unbalance in gate current is suppressed to merely reduce the difference in switching timing between the semiconductor switching elements connected in parallel. In this configuration, even in the case where the switching timings of the semiconductor switching elements coincide with each other, if there is a variation in impedance between the semiconductor switching elements, the timing of occurrence of recovery differs between the phases.

In the semiconductor device according to the present embodiment, even if the timing of occurrence of recovery differs as described above, resonance current due to the recovery can be inhibited from flowing around to reach the gate line, whereby a malfunction of each semiconductor switching element can be effectively inhibited.

In addition, it is also conceivable to, for example, selectively use semiconductor switching elements to suppress variation among the semiconductor switching elements in order to cause the recovery timings of the semiconductor switching elements to coincide with each other. However, in this case, the yield deteriorates, and cost increases.

The semiconductor device according to the present embodiment can eliminate the need for selecting parts such as the semiconductor switching elements so as to cause the recovery timings to coincide with each other, whereby cost reduction can be achieved.

Meanwhile, if, for example, a configuration is employed in which the switching speed of each semiconductor switching element itself is reduced so as not to cause any resonance, the loss increases. In this case, in order to attain thermal feasibility of causing generated heat to be equal to or smaller than an allowable value in a design adaptive to occurrence of loss, the semiconductor switching element has to be set to perform switching not at high speed but at low speed. In this case as well, a semiconductor switching element requiring high cost and having a large size, and an expensive semiconductor switching element having high performance, need to be used, and thus cost increases.

However, in the semiconductor device according to the present embodiment, even if high-speed switching is performed so that a high resonance current is generated, the resonance current can be inhibited from flowing around to reach the gate line, whereby it is possible to provide a highly-efficient and small-sized semiconductor device while inhibiting an operational defect of each semiconductor switching element.

Further, in the semiconductor device according to the present embodiment configured as described above,
  the first condition is satisfied on the basis of an impedance at a resonance frequency of a series resonance circuit including: an inductance component on a second path making connection between the second electrodes of the respective semiconductor switching elements; an inductance component and a resistance component on the first path; and a capacitance component of each semiconductor switching element.

As described above, the first condition is satisfied on the basis of the impedance at the resonance frequency of the series resonance circuit which is a path allowing resonance current to flow therethrough and which includes: the inductance component on the second path making connection between the second electrodes of the respective semiconductor switching elements; the inductance component and the resistance component on the first path; and the capacitance component of each semiconductor switching element.

In this manner, the impedance is adjusted so as to satisfy the above first condition even under a condition that the impedance is reduced most. This makes it possible to stably reduce a gate lift between the semiconductor switching elements and inhibit an operational defect regardless of the frequency of the resonance current.

Further, in the semiconductor device according to the present embodiment configured as described above, the set value is indicated as Zg/Zs which is a multiplication value, for the impedance Zg on the first path, relative to the impedance Zs on the third path, and the multiplication value Zg/Zs is set to 10.

The inventors conducted thorough researches, and as a result, have found that current can be effectively inhibited from flowing around to reach the gate line by setting the impedance on the first path which is a gate line to be at least ten times as high as the impedance on the third path which is a source line. Thus, a gate lift between the semiconductor switching elements can be further effectively reduced, and inhibition of operational defect can be achieved.

Further, in the semiconductor device according to the present embodiment configured as described above, an inductive inductance element having a frequency characteristic that an impedance thereof increases at a resonance frequency of the series resonance circuit, is provided on the first path, and the first condition is satisfied on the basis of the impedance at the resonance frequency of the series resonance circuit including the inductive inductance element.

Further, in the semiconductor device according to the present embodiment configured as described above, the inductive inductance element is a ferrite bead inductance element.

If, as described above, an inductive inductance element which is a ferrite bead or the like and which has a frequency characteristic that the impedance thereof increases at a resonance frequency is provided on the first path which is a gate line, and an impedance of the semiconductor device is adjusted so as to satisfy the first condition on the basis of the impedance at the resonance frequency, the need for increasing the resistance value of each gate resistance in order to satisfy the first condition is eliminated, for example. Consequently, a small-sized semiconductor device can be provided without increasing loss in switching.

Further, in the semiconductor device according to the present embodiment configured as described above, an LC series circuit having a first capacitance component and a first inductance component is provided so as to be connected in parallel to the third path, and the first condition is satisfied by adjusting the first capacitance component and the first inductance component such that an impedance at the LC series circuit is lower than the impedance or the third path at the resonance frequency of the series resonance circuit.

As described above, the LC series circuit composed of the first capacitance component and the first inductance component is configured to be connected in parallel to the third path which is a source line. In addition, the first capacitance component and the first inductance component are adjusted such that the impedance at the LC series circuit is lower than the impedance or the third path which is a source line at the resonance frequency of the series resonance circuit. In this manner, the impedance on the source terminal side of each semiconductor switching element can be further reduced at the resonance frequency. This makes it possible to further stably reduce a gate lift between the semiconductor switching elements and inhibit an operational defect regardless of the frequency of the resonance current.

Further, a power conversion apparatus according to the present embodiment configured as described above includes:

a power converter having phases and configured to perform power conversion between DC and AC; and the semiconductor device configured as above and provided to each of the phases, wherein the control unit controls the power converter to perform power conversion between DC and AC.

Such a configuration makes it possible to provide a power conversion apparatus which includes a small-sized and highly-efficient power converter such as an inverter and in which a malfunction of each semiconductor switching element is inhibited.

Second Embodiment

Hereinafter, a second embodiment or the present disclosure will be described with reference to the drawings, focusing on differences from the above first embodiment. The same portions as those in the above first embodiment are denoted by the same reference characters, and descriptions thereof will be omitted.

Figure 14:
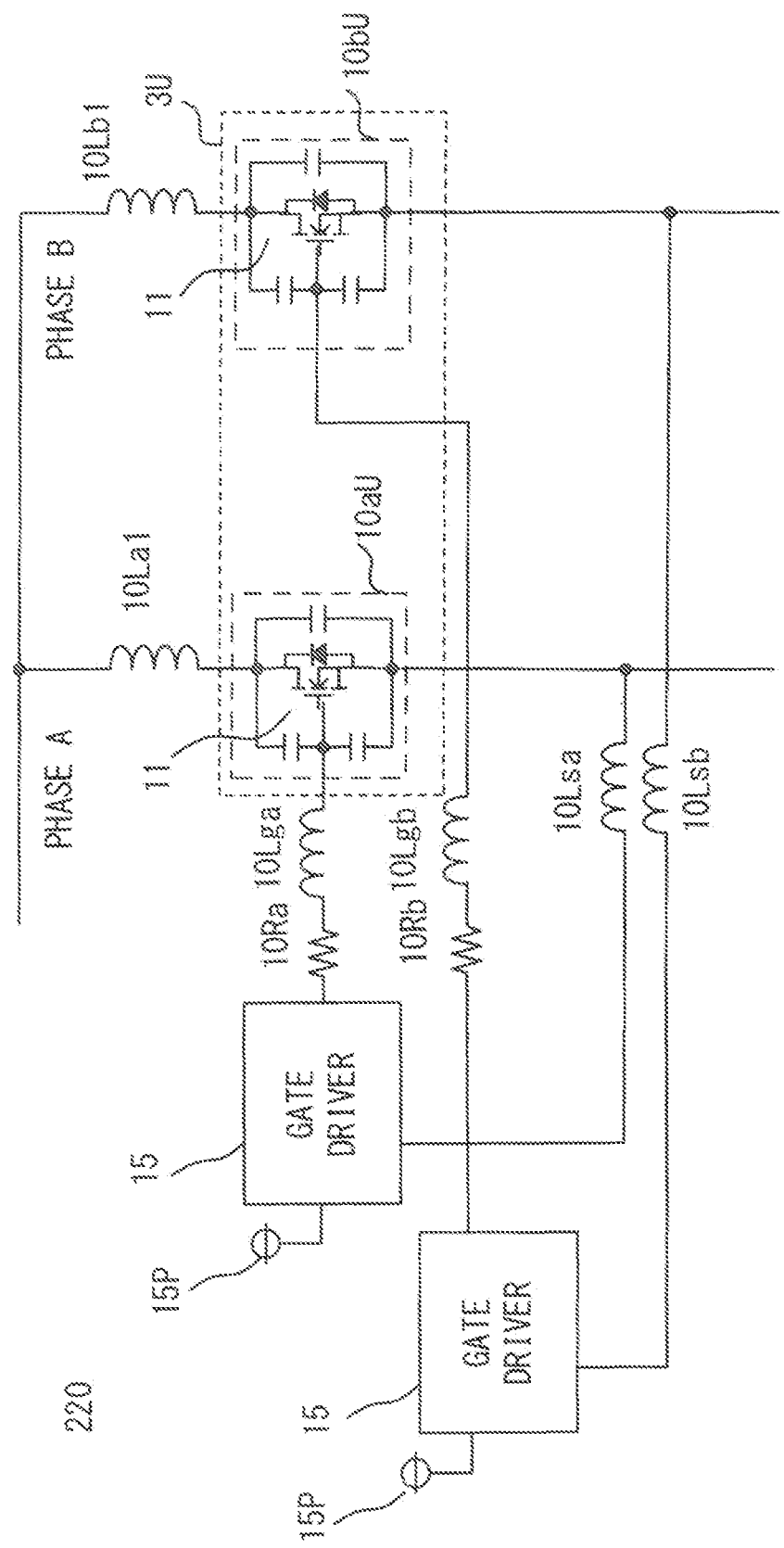
FIG. 14 is a schematic configuration diagram of a semiconductor device according to a second embodiment.

FIG. 14 is a schematic configuration diagram of a semiconductor device 220 according to the second embodiment.

Figure 15:
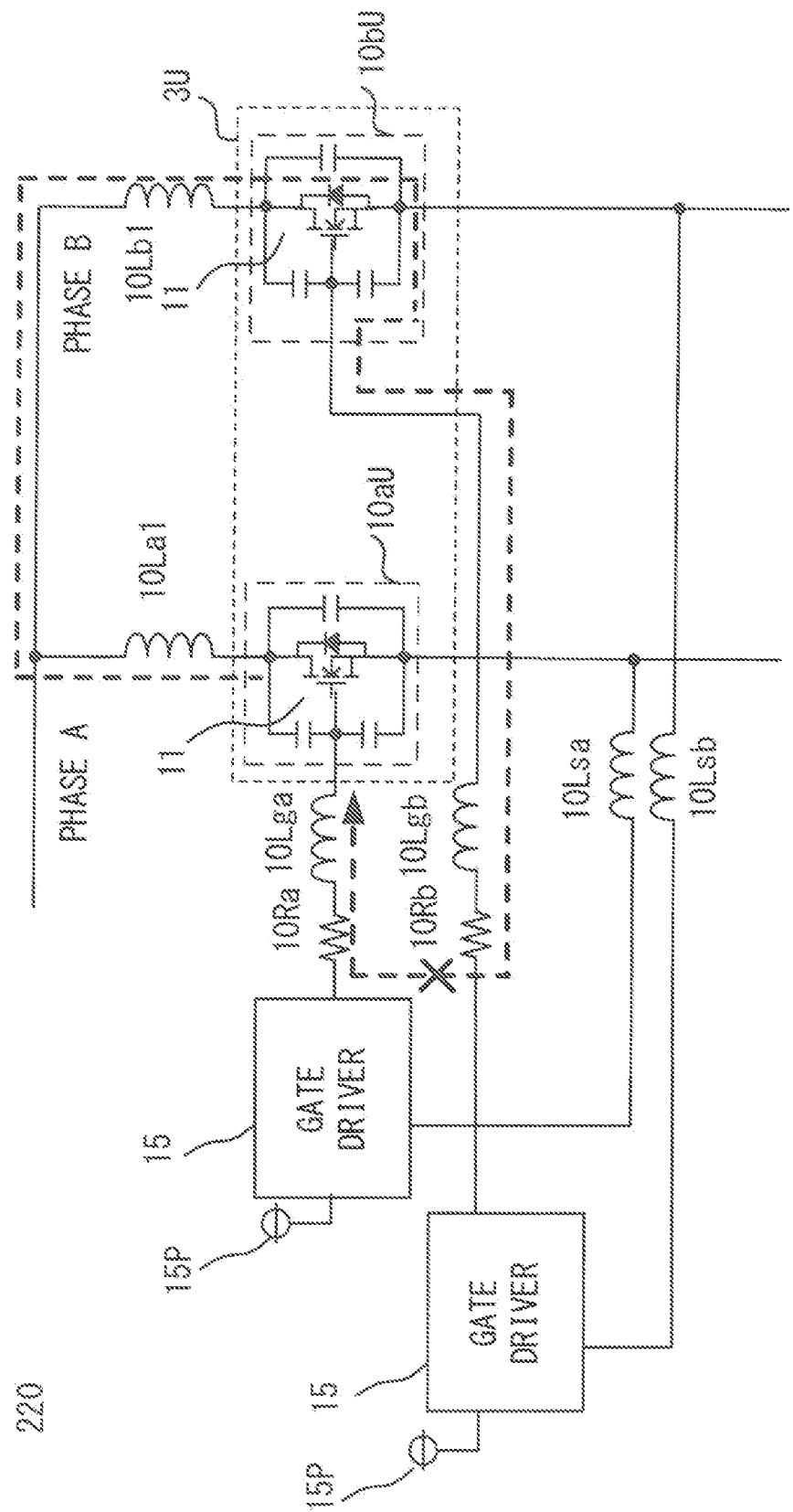
FIG. 15 is a diagram for explaining an advantageous effect of the semiconductor device according to the second embodiment.

FIG. 15 is a diagram for explaining an advantageous effect of the semiconductor device 220 according to the second embodiment.

It is noted that, for simplification of explanations, gate portions of the semiconductor switching element group 3U will be described in a focused manner in the present embodiment.

The semiconductor device 220 according to the present embodiment has a configuration in which the gate driver circuits 15 for controlling the MOSFETs 11 are independently provided to the power module 10aU for the phase A and the power module 10bU for the phase B, respectively. That is, the MOSFET 11 in the power module 10aU for the phase A and the MOSFET 11 in the power module 10bU for the phase B are controlled by the respective different gate driver circuits 15.

Here, each gate driver circuit 15 is provided with a gate driver power supply 15P, for drive, that serves as a power supply portion. A voltage for driving each gate driver circuit 15 is generated by the corresponding gate driver power supply 15P.

With such a configuration, an impedance between the gate driver power supplies 15P is ensured to be sufficiently high. Therefore, an impedance between the gate terminals of the MOSFET 11 for the phase A and the MOSFET 11 for the phase B is ensured to be high.

Specifics are as follows. A mere configuration in which the gate drivers 15 are independently provided so as to be separated might lead to generation of a path that involves a resonance transmitted between the gate driver power supplies 15P. However, in the semiconductor device 220 according to the present embodiment, the impedance between the gate driver power supplies 15P is set to be high and the impedance on the gate line is adjusted, in order to satisfy the first condition. Consequently, as shown in FIG. 15, a resonance path of a resonance current that flows around to reach the gate line can be eliminated. That is, the resonance path can be separated. Therefore, a gate lift between the MOSFETs 11 can be reduced.

It is noted that, regarding a semiconductor device (not shown) having a configuration in which only one gate driver power supply 15P is provided and the gate driver circuits 15 are driven by the one gate driver power supply, the semiconductor device only has to be configured such that high impedances are imparted to power supply paths that make connection from the one gate driver power supply 15P to the respective gate driver circuits 15. Methods to be employed in this case include a method in which the power supply paths are made as long wire paths.

With this configuration, the impedance between the gate terminals of the MOSFET 11 for the phase A and the MOSFET 11 for the phase B can be increased, and the above first condition can be satisfied.

In the semiconductor device according to the present embodiment configured as described above, the first condition is satisfied by independently providing the control units to the respective semiconductor switching elements.

If, as described above, the semiconductor device is configured such that the gate driver circuits serving as the control units are independently provided to the respective semiconductor switching elements, the impedance between the gate terminals of the semiconductor switching elements connected in parallel can be increased, and the above first condition can be satisfied.

Consequently, the same advantageous effect as that in the first embodiment is exhibited, and, even if a resonance occurs between the semiconductor switching elements connected in parallel, the amount of a resonance current that flows around to reach the gate line can be reduced. Therefore, a gate lift between the semiconductor switching elements can be reduced, and an erroneous turn-on operation can be inhibited.

Further, in the semiconductor device according to the present embodiment configured as described above, power supply portions each configured to supply power to the corresponding control unit are independently provided to the respective control units, and the first condition is satisfied by adjusting an impedance between the power supply portions.

In this manner, the gate driver power supplies each configured to supply power to the corresponding gate driver circuit are independently provided to the respective gate driver circuits. Further, if the impedance between the gate driver power supplies is adjusted to be high, the impedance between the gate terminals of the semiconductor switching elements connected in parallel can be increased, and the above first condition can be assuredly satisfied.

Consequently, the amount of a resonance current that flows around to reach the gate line can be further reduced, and a gate lift between the semiconductor switching elements can be further effectively reduced.

Further, in the semiconductor device according to the present embodiment configured as described above, the first condition is satisfied by adjusting impedances on power supply paths through each of which power is supplied from a power supply portion to the corresponding control unit.

In the case of employing a configuration in which, for example, only one gate driver power supply is provided as well, the impedance between the gate terminals of the semiconductor switching elements connected in parallel is increased, and the first condition can be satisfied, by adjusting the impedances on the power supply paths through each of which power is supplied to the corresponding gate driver circuit. Consequently, the amount of a resonance current that flows around to reach the gate line can be reduced, and a gate lift between the semiconductor switching elements can be effectively reduced.

Third Embodiment

Hereinafter, a third embodiment of the present disclosure will be described with reference to the drawings, focusing on differences from the above first embodiment. The same portions as those in the above first embodiment are denoted by the same reference characters, and descriptions thereof will be omitted.

Figure 16:
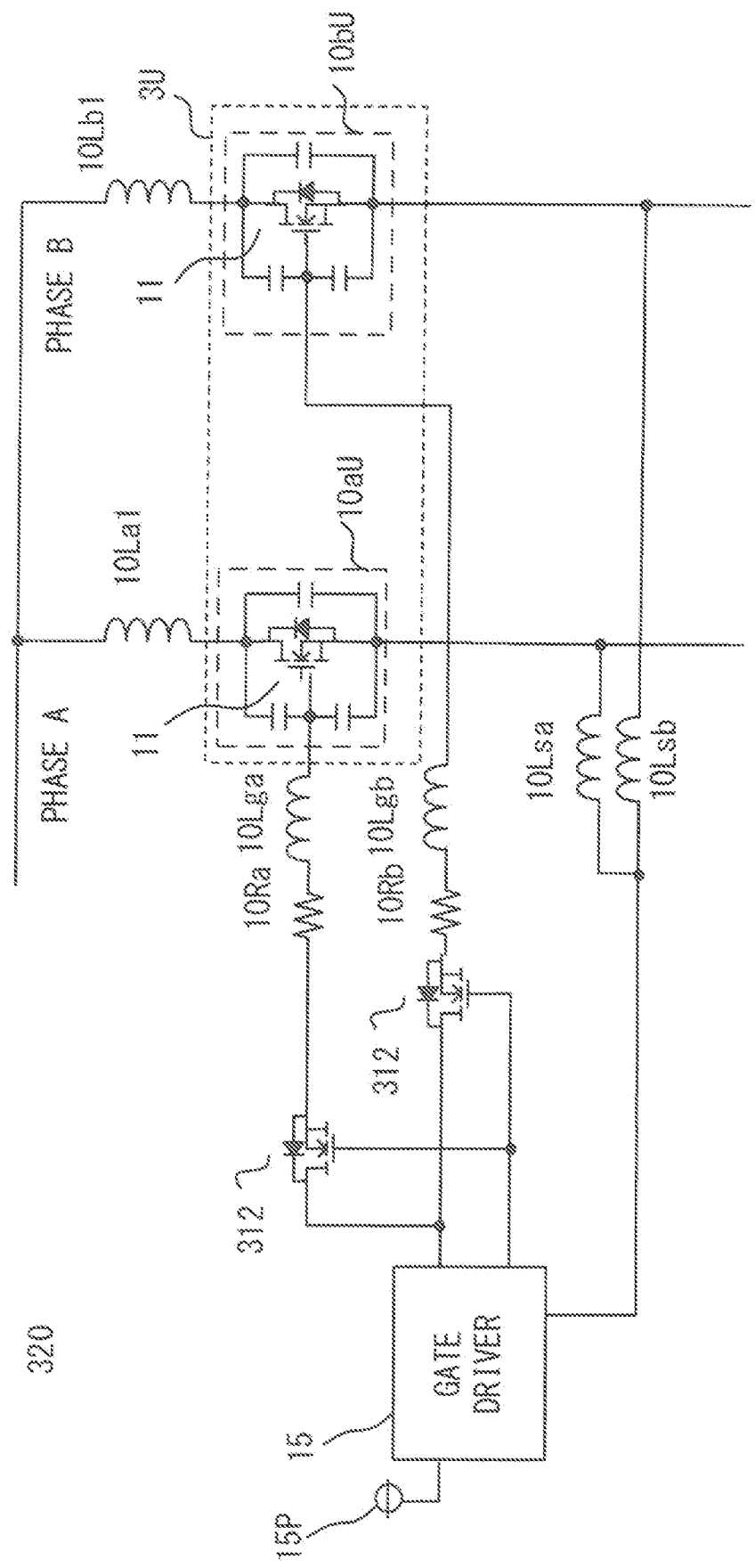
FIG. 16 is a schematic configuration diagram of a semiconductor device according to a third embodiment.

FIG. 16 is a schematic configuration diagram of a semiconductor device 320 according to the third embodiment.

Figure 17:
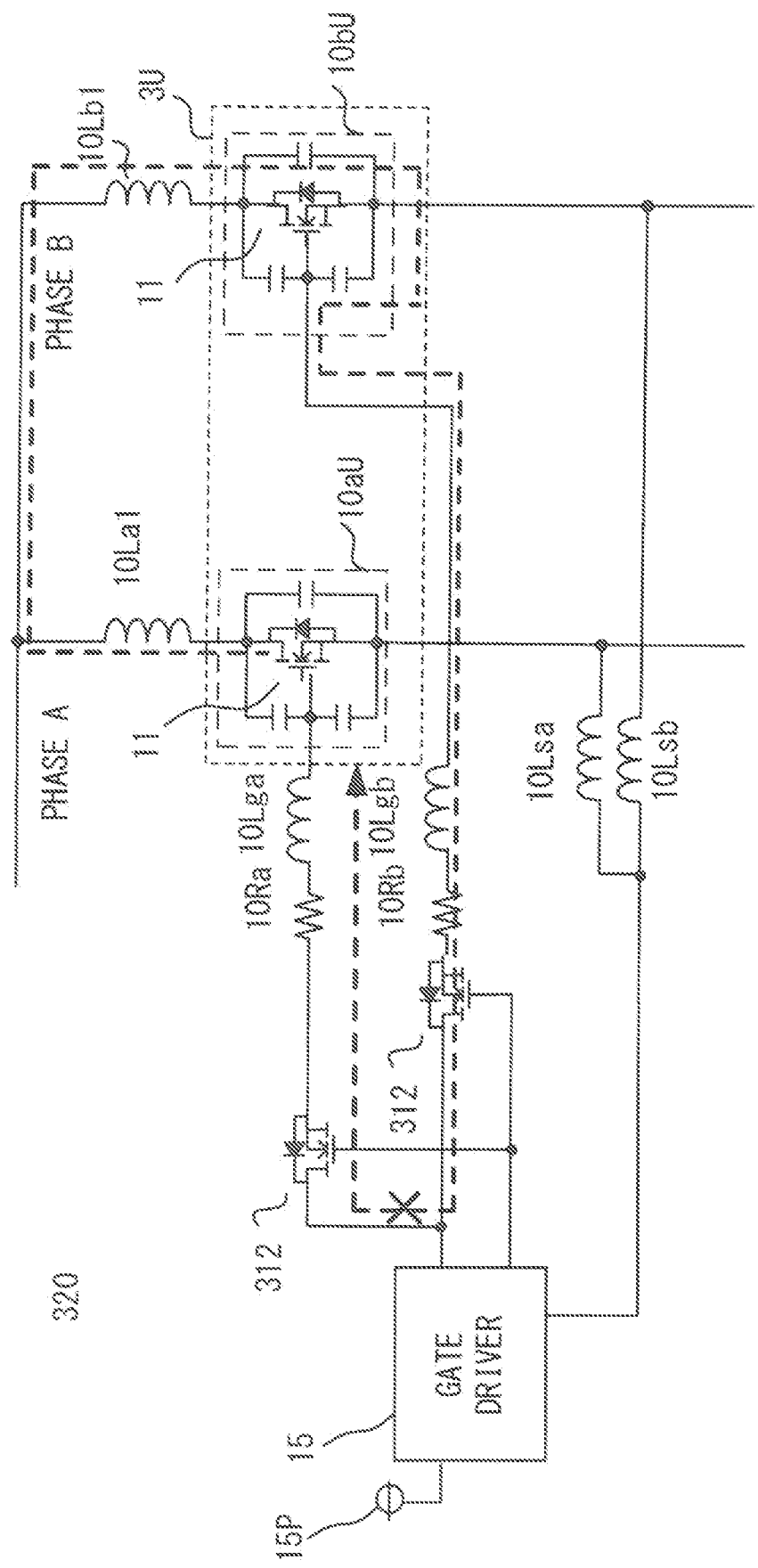
FIG. 17 is a diagram for explaining an advantageous effect of the semiconductor device according to the third embodiment.

FIG. 17 is a diagram for explaining an advantageous effect of the semiconductor device 320 according to the third embodiment.

A proposed measure that is to be taken by the semiconductor device 320 according to the third embodiment against the problem to be addressed in the present disclosure, is to separate a resonance path in the same manner as in the aforementioned second embodiment.

As shown in FIG. 16, the gate line serving as the first path and making connection between the gate terminal of the MOSFET 11 in the power module 10$a$U for the phase A and the gate terminal of the MOSFET 11 in the power module 10$b$U for the phase B is provided with switching elements 312 which serve as opening/closing devices and which disconnect/connect the gate line.

Further, when each MOSFET 11 is in a conducting state, the gate driver circuit 15 controls each switching element 312 to be in a closed state. Meanwhile, when the MOSFET 11 is in a non-conducting state, the gate driver circuit 15 controls the opening/closing device to be in an opened state. That is, when the MOSFET 11 in the operation mode in FIG. 8 (MODE e) is in an OFF state that is a state where a resonance current flows, the impedance between the gate terminals of the MOSFETs 11 connected in parallel is increased. That is, the impedance is set to be infinite. Thus, the above first condition is satisfied. Consequently, as shown in FIG. 17, the resonance path of resonance current can be eliminated, and a gate lift can be reduced.

It is noted that, although a P-channel MOSFET is shown as each switching element 312 in the drawings, the switching element 312 is not limited to a P-channel MOSFET and only has to have an opening/closing function.

Figure 18:
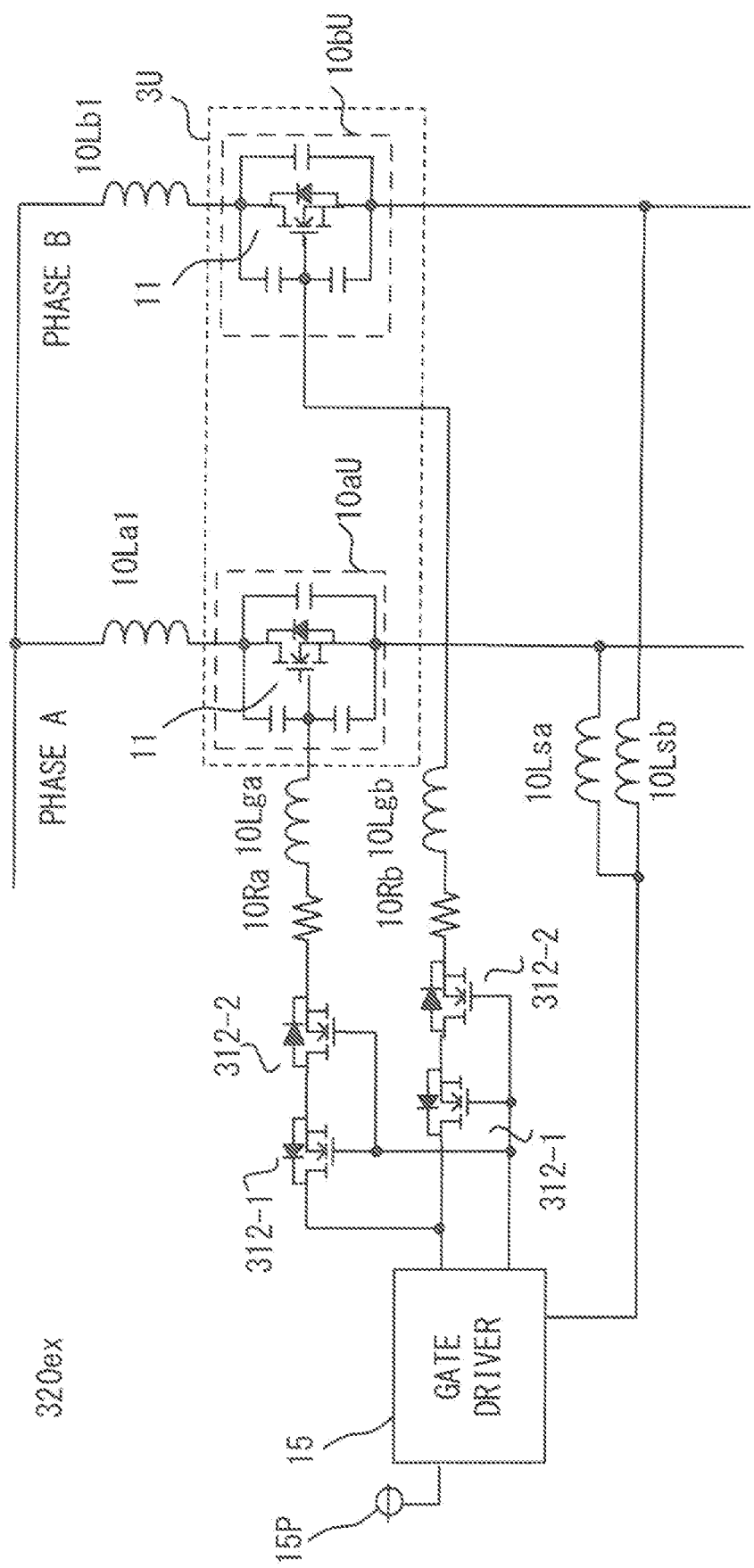
FIG. 18 is a schematic configuration diagram showing a modification of the semiconductor device according to the third embodiment.

Hereinafter, a semiconductor device 320$ex$ (shown in FIG. 18) different from the above semiconductor device 320 will be described as a further modification for assuredly satisfying the first condition.

If a MOSFET is used as each opening/closing device to be provided on the gate line, a parasitic diode is present. Therefore, even if the MOSFET is in an OFF state, the parasitic diode of the MOSFET which is the opening/closing device is turned on when the potential of the gate driver circuit 15 is lower than the gate voltage of the MOSFET 11. Considering this, a configuration in which a MOSFET 312-1 and a MOSFET 312-2 are connected in anti-series as opening/closing devices is employed to completely separate a resonance path. Consequently, resonance current which is alternating current can be interrupted, and the first condition can be assuredly satisfied.

Further, in the semiconductor device according to the present embodiment configured as described above, an opening/closing device is provided on the first path, and the first condition is satisfied by controlling the opening/closing device to be in a closed state when each semiconductor switching element is in a conducting state, and controlling the opening/closing device to be in an opened state when the semiconductor switching element is in a non-conducting state.

If, as described above, the opening/closing device is configured to be opened/closed according to the semiconductor switching element in the power module, the impedance between the gate terminals of the MOSFETs implementing the semiconductor switching elements in the power modules connected in parallel is increased. That is, the impedance is set to be infinite. Thus, the above first condition is assuredly satisfied.

Consequently, the same advantageous effect as that in the first embodiment is exhibited, and, even if a resonance occurs between the semiconductor switching elements connected in parallel, the amount of a resonance current that flows around to reach the gate line can be reduced. Therefore, a gate lift between the semiconductor switching elements can be reduced, and an erroneous turn-on operation can be inhibited.

Fourth Embodiment

Hereinafter, a fourth embodiment of the present disclosure will be described with reference to the drawings, focusing on differences from the above first embodiment. The same portions as those in the above first embodiment are denoted by the same reference characters, and descriptions thereof will be omitted.

As described above, the mechanism of a gate lift, between the semiconductor switching elements, which is the problem to be addressed in the present disclosure is as follows. That is, the gate lift occurs when, in a circuit with a configuration having a plurality of power modules connected in parallel, the post-switching recovery timing differs thereamong so that potential differences are generated between the drains and the sources in the respective power modules. That is, current flows from the power module having a higher voltage into the power module having a lower voltage.

In addition, as described above, even in the case where the switching timings of the power modules coincide with one another, if there is a variation in impedance between drain terminal portions and source terminal portions of the respective power modules, current at the time of turn-on operation differs. That is, the same state as that in the operation mode shown in FIG. 5 (MODE b) is attained.

Figure 19:
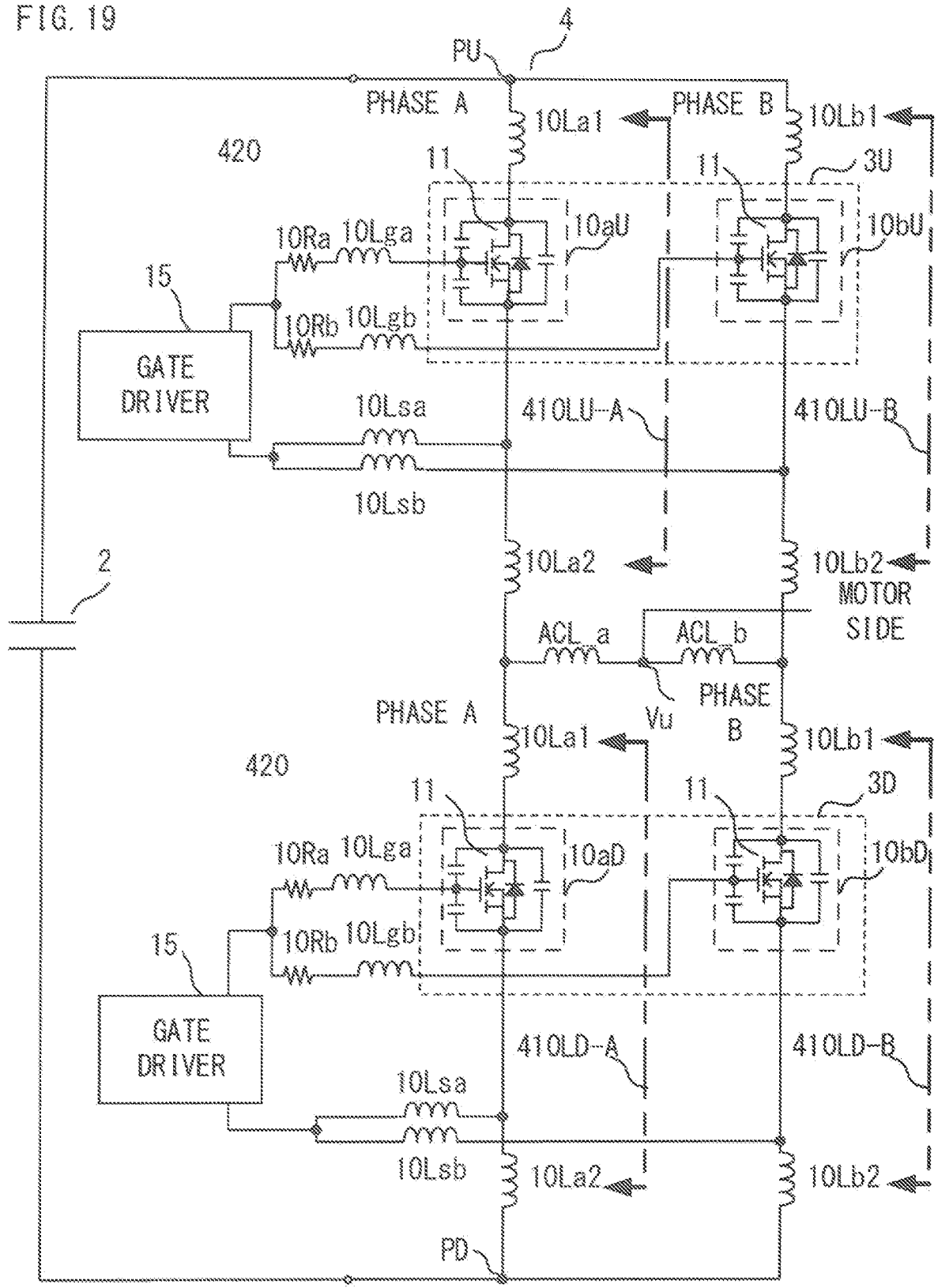
FIG. 19 is a schematic configuration diagram of a semiconductor device according to a fourth embodiment.

FIG. 19 is a schematic configuration diagram of a semiconductor device 420 according to the fourth embodiment.

Figure 20:
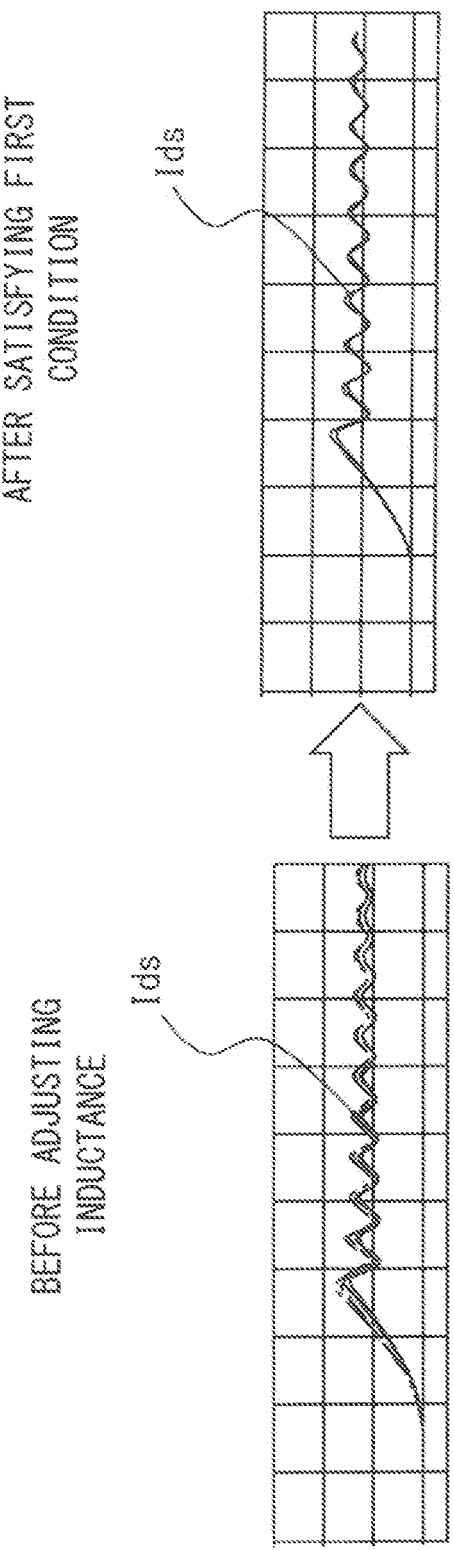
FIG. 20 is a waveform diagram for explaining an advantageous effect of the semiconductor device according to the fourth embodiment.

FIG. 20 is a diagram for explaining an advantageous effect of the semiconductor device 420 according to the fourth embodiment.

In the semiconductor device 420 according to the present fourth embodiment, balance is attained between an inductance component L410LU-A for the phase A and an inductance component L410LU-B for the phase B, at the upper arm, on main circuit lines of the respective power modules 10 of the semiconductor switching element groups 3 as shewn in FIG. 19 in order to suppress a resonance in the case where the switching timings coincide with each other.

Likewise, balance is attained between an inductance component L410LD-A for the phase A and an inductance component L410LD-B for the phase B at the lower arm.

Specifically, in the semiconductor switching element group 3U at the upper arm, the inductance components L410LU-A and L410LU-B on respective fourth paths extending from the connection point PU via the power modules 10aU and 10bU for the respective phases to the relevant one of the output terminals Vu, Vv, and Vw for the three phases out of the paths extending from the smoothing capacitor 2 to the main-circuit source line for each of the power modules 10aU and 10bU, are set to be equal to each other.

Likewise, in the semiconductor switching element group 3D at the lower arm, the inductance components L410LD-A and L410LD-B on respective fourth paths extending from a connection point between the drain terminals of the respective power modules 10aD and 10bD via the power modules 10aD and 10bD for the respective phases to the connection point PD out of the paths extending from the sides where drain portion terminals of the respective power modules 10aD and 10bD are present to the smoothing capacitor 2, are set to be equal to each other.

Consequently, balance is attained between turn-on currents at the time of switching, and the recovery timings coincide with each other. Therefore, the potential difference between the power modules can be reduced, and the resonance current can be reduced.

The inventors obtained, through analysis, a relationship between the switching speeds of the power modules and variation in inductance between the power modules. As a result, the inventors have found that variation in current at the time of turn-on operation is substantially eliminated as shown in FIG. 20 if the variation in inductance is set to be equal to or lower than 3% (the variation in inductance is set to be equal to or lower than 1 nH relative to about 33 nH) under a condition that the switching speed (di/dt) of each power module is 10 kA/us. Therefore, the potential difference between the power modules can be reduced, and the resonance current can be reduced.

In the semiconductor device according to the present embodiment configured as described above, a connection point between the second electrodes of the respective semiconductor switching elements on the second path is defined as a first connection point, a connection point between the third electrodes of the respective semiconductor switching elements on the third path is defined as a second connection point, and impedances on respective fourth paths extending from the first connection point via the respective semiconductor switching elements to the second connection point, are set to be equal to one another.

In this manner, the impedances on the paths extending from the first connection point PU on the drain line which is the second path and which makes connection between the drain terminals of the semiconductor switching elements connected in parallel, via the respective semiconductor switching elements for the phase A and the phase B to the AC input/output terminal serving as the second connection point on the main-circuit source line which is the third path and which makes connection between the source terminals, are set to be equal to each other.

If such a configuration is used in combination with any of the configurations described in the above first to third embodiments, it is possible to reduce a gate lift between the semiconductor switching elements while suppressing variation in current at the time of turn-on operation.

The resonance phenomenon, due to the potential difference between the power modules, which has been described in the above first to third embodiments and which is the problem to be addressed in the present disclosure, becomes more prominent as the potential difference becomes larger. Even if differences in switching timing and in recovery timing can be reduced, when the switching speed (dV/dt) is high, even a slight difference in timing might lead to generation of a potential difference. Therefore, the advantageous effect of the semiconductor device according to the present embodiment is exhibited more with an element that is switched at a higher speed (more likely to lead to generation of a potential difference). Specifically, if an SiC element which is a wide-bandgap semiconductor is used as a semiconductor switching element, a resonance is more likely to occur and the advantageous effect is exhibited more than if another element is used.

That is, a wide-bandgap semiconductor made from silicon carbide, a gallium nitride-based material, or diamond is used as each semiconductor switching element according to any of the embodiments.

Although an example in which the inverter circuit is used as a power converter has been described regarding the power conversion apparatus according to each of the embodiments, the power converter is not limited to an inverter circuit and may be a converter circuit. Any power converter including a plurality of semiconductor switching elements connected in parallel suffers the same problem, and the problem can be solved through the above measure.

In addition, although the number of chips of the semiconductor switching elements in the power modules is not clarified in the drawings regarding the semiconductor device according to any of the embodiments, the number of chips in a package may be one or more. Regardless of the number, the same problem arises, and the measure also leads to exhibition of the same advantageous effect.

In addition, although, regarding the number of the semiconductor switching elements connected in parallel, the semiconductor device according to each of the embodiments has been described as having a configuration with two semiconductor switching elements connected in parallel, the present disclosure is not limited to this configuration. The number of the semiconductor switching elements connected in parallel only has to be more than one, and thus three semiconductor switching elements may be connected in parallel.

Figure 21:
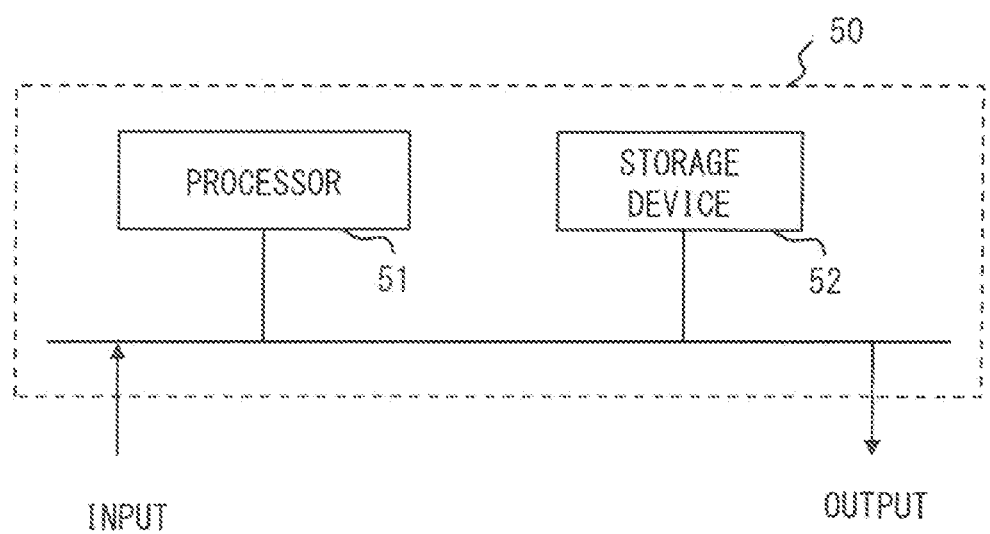
FIG. 21 is a schematic configuration diagram showing a hardware configuration of a control unit in each of the first to fourth embodiments.

FIG. 21 is a schematic configuration diagram showing a hardware configuration of the control unit in each of the first to fourth embodiments.

It is noted that the control unit 50 is composed of a processor 53 and a storage device 52, an example of hardware of the control unit 50 being shown in FIG. 21. The storage device 52 includes a volatile storage device (not shown) such as a random access memory, and a nonvolatile auxiliary storage device (not shown) such as a flash memory. Alternatively, the storage device may include, as the auxiliary storage device, a hard disk instead of a flash memory. The processor 51 executes a program inputted from the storage device 52. In this case, the program is inputted from the auxiliary storage device via the volatile storage device to the processor 51. Further, the processor 51 may output data such as a computation result to the volatile storage device of the storage device 52 or may save the data via the volatile storage device into the auxiliary storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

11 MOSFET (semiconductor switching element)
3, 3U, 3D semiconductor switching element group (first circuit)
15 gate driver circuit (control unit)
15P gate driver power supply (power supply portion)
20, 20ex, 220, 320, 320ex, 420 semiconductor device
50 control unit
312, 312-1, 312-2 switching element (opening/closing device)
100 power conversion apparatus

What is claimed is:
1. A semiconductor device comprising:
a first circuit including semiconductor switching elements connected in parallel, each semiconductor switching element having a first electrode, a second electrode, and a third electrode and being configured to be controlled, according to a voltage between the first electrode and the third electrode, to attain conduction or non-conduction between the second electrode and the third electrode; and
a controlling circuitry connected to the first electrode of each semiconductor switching element and configured to control the voltage between the first electrode and the third electrode, wherein
the semiconductor device is configured to satisfy a first condition that an impedance Zg on a first path between the first electrodes of the respective semiconductor switching elements is higher, by at least a set value, than an impedance Zs on a third path making connection between the third electrodes of the respective semiconductor switching elements,
the first condition is satisfied on the basis of an impedance at a resonance frequency of a series resonance circuit including: an inductance component on a second path making connection between the second electrodes of the respective semiconductor switching elements; an inductance component and a resistance component on the first path; and a capacitance component of each semiconductor switching element,
an inductive inductance element having a frequency characteristic that an impedance thereof increases at a resonance frequency of the series resonance circuit, is provided on the first path, and the first condition is satisfied on the basis of the impedance at the resonance frequency of the series resonance circuit including the inductive inductance element.

2. The semiconductor device according to claim 1, wherein
an LC series circuit having a first capacitance component and a first inductance component is provided so as to be connected in parallel to the third path, and
the first condition is satisfied by adjusting the first capacitance component and the first inductance component such that an impedance at the LC series circuit is lower than the impedance on the third path at the resonance frequency of the series resonance circuit.

3. The semiconductor device according to claim 1, wherein
the first condition is satisfied by independently providing the controlling circuitry to the respective semiconductor switching elements.

4. The semiconductor device according to claim 3, wherein
the first condition is satisfied by adjusting impedances on power supply paths through each of which power is supplied from a power supply portion to the corresponding controlling circuitry.

5. The semiconductor device according to claim 3, wherein
power supply portions each configured to supply power to the corresponding controlling circuitry are independently provided to the respective controlling circuitry, and
the first condition is satisfied by adjusting an impedance between the power supply portions.

6. The semiconductor device according to claim 1, wherein
an opening/closing device is provided on the first path, and
the first condition is satisfied by
controlling the opening/closing device to be in a closed state when each semiconductor switching element is in a conducting state, and
controlling the opening/closing device to be in an opened state when the semiconductor switching element is in a non-conducting state.

7. The semiconductor device according to claim 1, wherein
a connection point between the second electrodes of the respective semiconductor switching elements on the second path is defined as a first connection point,
a connection point between the third electrodes of the respective semiconductor switching elements on the third path is defined as a second connection point, and
impedances on respective fourth paths extending from the first connection point via the respective semiconductor switching elements to the second connection point, are set to be equal to one another.

8. The semiconductor device according to claim 7, wherein
a variation in impedance between the fourth paths is set to be within ±3%.

9. The semiconductor device according to claim 1, wherein
the inductive inductance element is a ferrite bead inductance element.

10. The semiconductor device according to claim 1, wherein
a wide-bandgap semiconductor made from silicon carbide, a gallium nitride-based material, or diamond is used as each semiconductor switching element.

11. The semiconductor device according to claim 1, wherein
a switching speed of each semiconductor switching element is adjusted to be equal to or higher than 10 kA/us.

12. The semiconductor device according to claim 1, wherein
the set value is indicated as Zg/Zs which is a multiplication value, for the impedance Zg on the first path, relative to the impedance Zs on the third path, and
the multiplication value Zg/Zs is set to 10.

13. The semiconductor device according to claim 12, wherein
an LC series circuit having a first capacitance component and a first inductance component is provided so as to be connected in parallel to the third path, and
the first condition is satisfied by adjusting the first capacitance component and the first inductance component such that an impedance at the LC series circuit is lower than the impedance on the third path at the resonance frequency of the series resonance circuit.

14. The semiconductor device according to claim 1, wherein
an LC series circuit having a first capacitance component and a first inductance component is provided so as to be connected in parallel to the third path, and
the first condition is satisfied by adjusting the first capacitance component and the first inductance component such that an impedance at the LC series circuit is lower than the impedance on the third path at the resonance frequency of the series resonance circuit.

15. The semiconductor device according to claim 1, wherein
the first condition is satisfied by independently providing the controlling circuitry to the respective semiconductor switching elements.

16. A semiconductor device comprising:
a first circuit including semiconductor switching elements connected in parallel, each semiconductor switching element having a first electrode, a second electrode, and a third electrode and being configured to be controlled, according to a voltage between the first electrode and the third electrode, to attain conduction or non-conduction between the second electrode and the third electrode; and
a controlling circuitry connected to the first electrode of each semiconductor switching element and configured to control the voltage between the first electrode and the third electrode, wherein
the semiconductor device is configured to satisfy a first condition that an impedance Zg on a first path between the first electrodes of the respective semiconductor switching elements is higher, by at least a set value, than an impedance Zs on a third path making connection between the third electrodes of the respective semiconductor switching elements,
the first condition is satisfied on the basis of an impedance at a resonance frequency of a series resonance circuit including: an inductance component on a second path making connection between the second electrodes of the respective semiconductor switching elements; an inductance component and a resistance component on the first path; and a capacitance component of each semiconductor switching element, the set value is indicated as Zg/Zs which is a multiplication value, for the impedance Zg on the first path, relative to the impedance Zs on the third path, and the multiplication value Zg/Zs is set to 10.

17. The semiconductor device according to claim 16, wherein an LC series circuit having a first capacitance component and a first inductance component is provided so as to be connected in parallel to the third path, and the first condition is satisfied by adjusting the first capacitance component and the first inductance component such that an impedance at the LC series circuit is lower than the impedance on the third path at the resonance frequency of the series resonance circuit.

18. A power conversion apparatus comprising:

a power converter having phases and configured to perform power conversion between DC and AC; and a semiconductor device provided to each of the phases, wherein the semiconductor device comprising:

a first circuit including semiconductor switching elements connected in parallel, each semiconductor switching element having a first electrode, a second electrode, and a third electrode and being configured to be controlled, according to a voltage between the first electrode and the third electrode, to attain conduction or non-conduction between the second electrode and the third electrode; and a controlling circuitry connected to the first electrode of each semiconductor switching element and configured to control the voltage between the first electrode and the third electrode, wherein the semiconductor device is configured to satisfy a first condition that an impedance Zg on a first path between the first electrodes of the respective semiconductor switching elements is higher, by at least a set value, than an impedance Zs on a third path making connection between the third electrodes of the respective semiconductor switching elements, wherein the controlling circuitry controls the power converter to perform power conversion between DC and AC, the first condition is satisfied on the basis of an impedance at a resonance frequency of a series resonance circuit including: an inductance component on a second path making connection between the second electrodes of the respective semiconductor switching elements; an inductance component and a resistance component on the first path; and a capacitance component of each semiconductor switching element, an inductive inductance element having a frequency characteristic that an impedance thereof increases at a resonance frequency of the series resonance circuit, is provided on the first path, and the first condition is satisfied on the basis of the impedance at the resonance frequency of the series resonance circuit including the inductive inductance element.

* * * * *